Dec. 6, 1966 E. S. ANDERSON ET AL 3,290,444

COORDINATION AND CONTROL OF TRANSMISSION COMPATIBILITY AMONG PRIVATE NETWORK, TIE LINE, AND TOLL MESSAGE NETWORK LINES AND TRUNKS IN CROSSBAR OFFICES

Filed Nov. 12, 1963 9 Sheets-Sheet 1

INVENTORS E. S. ANDERSON
E. D. MASUCCI

BY Howard R Popper

ATTORNEY

Dec. 6, 1966 E. S. ANDERSON ET AL 3,290,444

COORDINATION AND CONTROL OF TRANSMISSION COMPATIBILITY AMONG PRIVATE NETWORK, TIE LINE, AND TOLL MESSAGE NETWORK LINES AND TRUNKS IN CROSSBAR OFFICES

Filed Nov. 12, 1963 9 Sheets-Sheet 2

Dec. 6, 1966 E. S. ANDERSON ET AL 3,290,444

COORDINATION AND CONTROL OF TRANSMISSION COMPATIBILITY AMONG PRIVATE NETWORK, TIE LINE, AND TOLL MESSAGE NETWORK LINES AND TRUNKS IN CROSSBAR OFFICES

Filed Nov. 12, 1963 9 Sheets-Sheet 4

COORDINATION AND CONTROL OF TRANSMISSION COMPATIBILITY AMONG PRIVATE NETWORK, TIE LINE, AND TOLL MESSAGE NETWORK LINES AND TRUNKS IN CROSSBAR OFFICES

Dec. 6, 1966 E. S. ANDERSON ET AL 3,290,444

COORDINATION AND CONTROL OF TRANSMISSION COMPATIBILITY AMONG PRIVATE NETWORK, TIE LINE, AND TOLL MESSAGE NETWORK LINES AND TRUNKS IN CROSSBAR OFFICES

Filed Nov. 12, 1963 9 Sheets-Sheet 6

Dec. 6, 1966 E. S. ANDERSON ET AL 3,290,444

COORDINATION AND CONTROL OF TRANSMISSION COMPATIBILITY AMONG PRIVATE NETWORK, TIE LINE, AND TOLL MESSAGE NETWORK LINES AND TRUNKS IN CROSSBAR OFFICES

Filed Nov. 12, 1963 9 Sheets-Sheet 7

Dec. 6, 1966 E. S. ANDERSON ET AL 3,290,444

COORDINATION AND CONTROL OF TRANSMISSION COMPATIBILITY AMONG PRIVATE NETWORK, TIE LINE, AND TOLL MESSAGE NETWORK LINES AND TRUNKS IN CROSSBAR OFFICES

Filed Nov. 12, 1963 9 Sheets-Sheet 9

United States Patent Office 3,290,444

Patented Dec. 6, 1966

3,290,444

COORDINATION AND CONTROL OF TRANSMISSION COMPATIBILITY AMONG PRIVATE NETWORK, TIE LINE, AND TOLL MESSAGE NETWORK LINES AND TRUNKS IN CROSSBAR OFFICES

Eugene S. Anderson, Westerville, and Eugene D. Masucci, Columbus, Ohio, assignors to Bell Telephone Laboratories, Incorporated, New York, N.Y., a corporation of New York Filed Nov. 12, 1963, Ser. No. 322,937

10 Claims. (Cl. 179—16)

Figure 1:
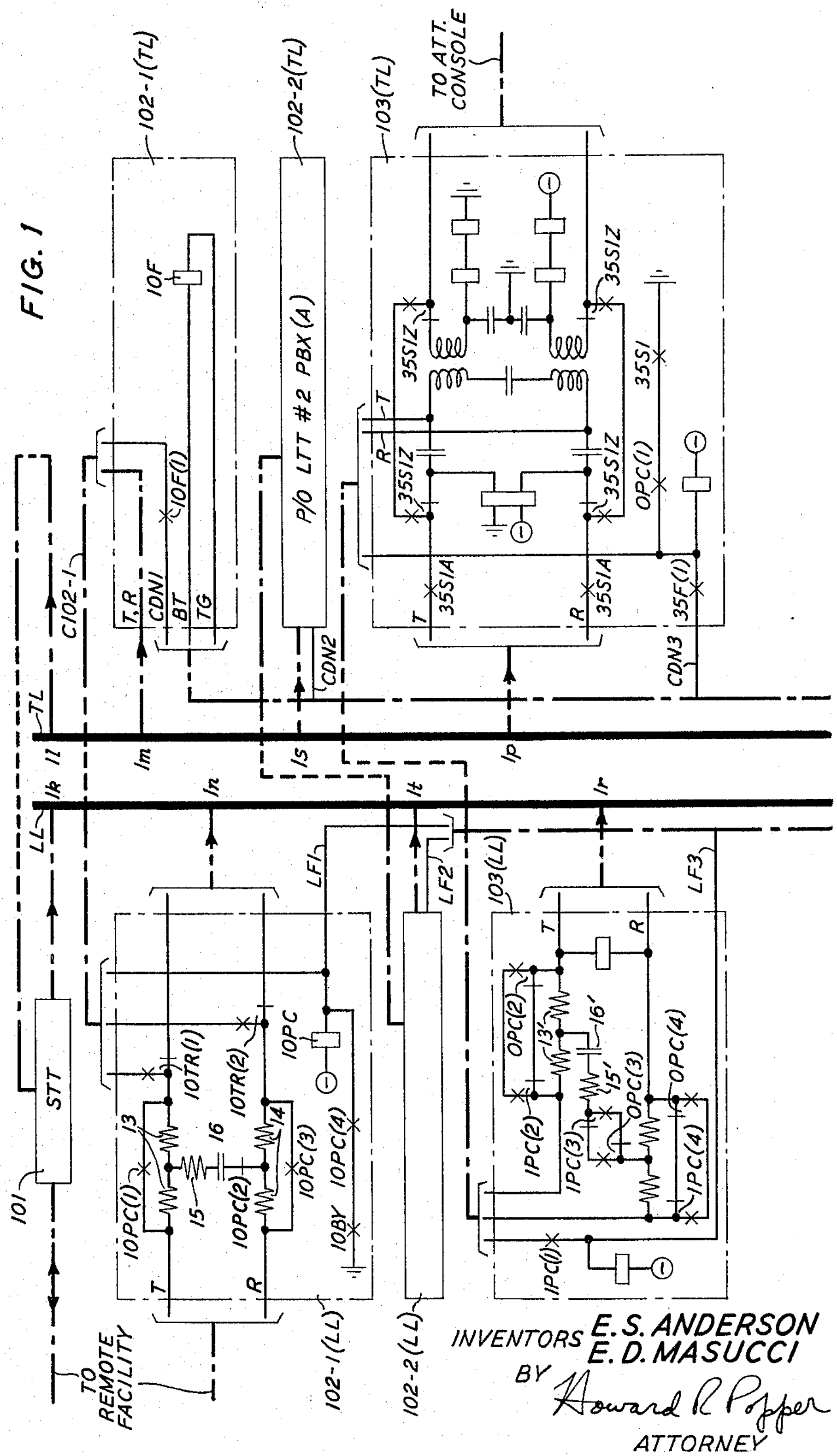

This invention relates to the improvement of telephone transmission and more particularly to control of transmission improvement devices at central offices which switch connections among individual lines, customer group lines, and private and common carrier trunks.

Lines and trunks entering a telephone office exhibit individual transmission characteristics because of their different lengths, the accuracy of their terminal impedance match, the ambient conditions to which they are subjected, et cetera. In an attempt to standardize the quality of communication between any two telephones in the direct distance dialing network certain procedures described, inter alia, in "Notes On Distance Dialing—1961," published by the American Telephone and Telegraph Company for the information of the telephone industry, are in effect today. These procedures deal primarily with the standardization of transmission quality on intertoll connections. Intertoll connections are connections between toll switching centers and as such account for the major portion of common carrier traffic taking place on a long distance basis. However, many business organizations have leased private line systems utilizing dedicated tie line trunks which involve extended private network switching connections between PBX's. Very often long distance connections are built up which rival in extent those that exist in the common carrier toll network. Transmission quality thus is becoming of equally great importance in these private systems. This is especially true when interconnections between private network and common carrier network systems are effected.

The term Via Net Loss (VNL) has been defined as the transmission standard for intertoll trunks operating as intermediate links in a switched connection. The intertoll trunk circuit is chosen as the standard because much care is taken in arranging the terminations to provide good matching (high "return loss") and thereby minimal echo. While the intermediate links are carefully standardized, the local termination may be to a telephone set that is adjacent to the toll office or to one that may be located on a customer loop of great length. Since all of the customer loops cannot be standardized (it would be prohibitively expensive to do so), the toll facility is presented with a range of impedances by local terminations. Intertoll trunks, however, are sufficiently few in number to permit their being very carefully matched and repeated to provide Via Net Loss transmission.

When an intertoll trunk is connected to a low loss toll connecting trunk terminating at a low loss line whose transmission characteristics are not ordinarily accurately known, an attenuation pad may advantageously be utilized in the connection. This compensates for inaccuracy in the terminal impedance match (low "return loss") and prevents the mismatch of impedance from giving rise to echo or singing. While the use of such pads has proven entirely suitable in the common carrier network where connections may be classified simply as through-switched or terminating, certain problems arise if an attempt is made to make use of them in central offices which switch private network systems.

Some of the more important differences in the manner of switching as accomplished in the common carrier and in the private network systems may be mentioned at this point. In the common carrier system, the insertion of a pad can be controlled by simplex signaling between trunks so that when an intertoll trunk connects to a low loss non-intertoll trunk, a pad associated with the intertoll trunk is appropriately switched to compensate for the poor return loss characteristics of the non-intertoll trunk. This procedure is suitable only where the trunks being connected can signal each other by simplex type signaling. Dial pulse repeating trunks, for example, are not compatible with this type of signaling and most if not all tie line trunks are of the dial pulse signaling type.

Another difference may be observed in crossbar offices operating in the common carrier network which employ tandem trunks, i.e., trunks which have appearances both on the line link and on a trunk link frame. The usual significance of these tandem appearances is that they enable an intertoll trunk at some times to carry a telephone call that is to terminate to a telephone line in the immediate office and at other times to carry a call that cannot be completed to a line in the telephone office under consideration, but which can be extended towards its destination by a trunk outgoing to the appropriate office serving the called customer. When completing to a local station, the linkage is set from the trunk link frame appearance and when connecting to an outgoing trunk, the linkage is set from the line link frame appearance of the intertoll trunk. In the first mentioned case where the intertoll trunk is to terminate to a line in the same office, an attenuation pad will normally be required and this is quite easily taken care of by fixing the pad in the trunk link frame appearance of the intertoll trunk so that whenever this appearance is used on a linkage the pad is in the communications channel. On the tandem outgoing call, however, i.e., one in which the linkage extends from the line link frame appearance of the tandem trunk to an outgoing trunk, a pad is neither necessary nor desirable and so none is included in the line link appearance of the tandem trunk.

With the advent of customer group service which provides centralized PBX services to pluralities of different PBX telephone customers, certain problems arise when the above mentioned procedures are attempted to be employed that is, when long-haul tie line trunks are considered on the same basis as intertoll trunks. While a long-haul tie line trunk resembles an intertoll trunk in that it has appearances on the line link and trunk link frames of the office, these appearances are not used in the same manner as the corresponding appearances of the intertoll trunk. The line link frame appearance of the long-haul tie trunk may complete either to an intraoffice trunk and (this in turn may be connected to a subscriber's line) or the line link frame appearance may be connected to another outgoing long-haul tie trunk. The trunk link frame appearance of a long-haul tie trunk does not directly complete to line link frame circuits as in the case of an intertoll trunk. Completion to a local station is via an intraoffice trunk seized from the line link appearance of the tie trunk. The trunk link appearance of the tie trunk is seized only for use on outgoing calls. It is thus evident that tandem trunks with pads fixed in their trunk link frame appearance may only be employed when all connections to be extended therefrom are to be attenuated. Since the trunk link frame appearance of a long-haul tie trunk may, however, be seized from the line link frame appearance of another long-haul tie trunk, the existence of a fixed pad provided on the same basis as the intertoll trunk would cause undue attenuation in the transmission channel.

Another problem arises because even the intertoll trunk circuit becomes inefficient and introduces excess attenuation when completing to certain recently added line link frame circuits such as line link pulsing access circuits which have become necessary in implementing fully the advantages of customer group service. It has just been explained how an intertoll trunk may complete to a line served in the same office utilizing its trunk link frame appearance which possesses a fixed pad and repeat coil but the line to which the connection is made may not be an ordinary subscriber's line but may, in fact, be a line link pulsing access line to a "main" PBX. The "main" PBX is so termed because it possesses the capability of serving as a switching point for satellite PBX's. Such a line, or more properly line circuit, is described in the copending application of T. V. Burns et al., Serial No. 240,558, filed November 28, 1962, now Patent No. 3,264,415. This line circuit is a carefully balanced impedance-compensated circuit and the existence of the fixed pad and repeat coil in the intertoll trunk needlessly attenuates the transmission level. Thus, once interconnections are made between the common carrier and the private network system, assumptions that were permissible in the common carrier network are no longer generally applicable.

Accordingly, it is an object of the present invention to achieve improvement in telephone transmission taking place in private network switching systems and, particularly, to improve communication quality through central offices serving both private and common carrier network systems.

In accordance with one illustrative embodiment of the present invention, certain trunks appearing in a telephone switching office are provided with controllable pads. The marker operates in cooperation with the indicating and control circuits in these trunks and with the line circuits that appear in the telephone office to provide for the insertion and deletion of the attenuation pads incident to the establishment of the individual connections that may be set up for the different types of calls normally handled by the telephone office.

The marker cooperates with the indicating circuits from the lines and from the trunks by receiving from the calling one thereof a preliminary indication as to whether pad control should be considered on the ensuing connection. For this purpose the calling line furnishes a particular rate treatment or particular group class of service indication and a calling trunk furnishes a particular identifying mark via a path established through the trunk link or through the line link connector. In addition, certain trunks which are provided with line link frame appearances furnish group class of service indications to the marker from the line link frame appearances thereof. Incident to the establishment of the communications connection, the marker is informed of the nature of the called line, trunk, or route and if an indication to consider pad control has priorly been registered, the marker cooperates with the control circuits of the trunks having controllable pads by transmitting control signals selectively to either the line link frame or trunk link frame appearances thereof.

The same common control circuitry of the marker operates with these foregoing trunks regardless of whether the pad control circuitry of the trunk maintains the pad in the normally in-circuit or in the normally out-of-circuit condition. Moreover, the marker circuitry which normally cooperates with the indicating and control circuitry of these trunks for the purpose of transmitting pad control signals thereto is also enabled to transmit these same signals to certain trunks which respond by selecting a particular one of their output appearances for the further extension of calls.

Certain trunks which are incoming to the office indicate to the marker a trunk class of service in addition to the aforementioned identifying mark. While an identifying mark normally serves to indicaate to the marker the fact that the marker should consider exercising pad control on the ensuing connection, the trunk class of service indication provided by these certain trunks is used to modify the marker handling of calls from these trunks to other trunks also possessing pad control capability.

The above and other trunks, hereinafter to be more fully described, with which the marker is capable of dealing fall into two broad categories. The first category includes the tie trunks which are dedicated to telephone customers subscribing for customer group or CENTREX service, so-called, which is described in the November 1961 issue of Transactions of the American Institute of Electrical Engineers. These tie trunks are furnished with a distinctive rate treatment classification so that when one of them is carrying a call incoming to the office, the code point and route relay selected by the carried call will be screened against the rate treatment of that trunk to operate a route series relay. The route series relay, in accordance with the principles herein disclosed, is provided with contacts and a control signal path for the application of pad control operating voltages selectively to either the line link or trunk link appearances of the trunk depending on the nature of the connection established in accordance with the call. Thus, a pad control operating signal may be applied back to the calling tie trunk over a path selected and enabled incident to the operation of the relay designating the called trunk route.

In CENTREX service, as also described in full detail in the copending application of Fisher et al., Serial No. 191,507, filed May 1, 1962, now Patent No. 3,253,088, trunks designated attendant trunks and having both line link and trunk link frame appearances are used when directory number calls are made and also when PBX dial "9" and attendant transfer calls are being made. Under certain conditions, therefore, a connection to the trunk link frame appearance of an attendant trunk may be made from a line of any of the various classes of service mentioned above or from the line link frame appearance of one of the aforementioned first types of trunks. Similarly, the line link frame appearance of that attendant trunk may be connected to the trunk link frame appearance of one of the aforementioned first group of trunks. Thus, since the direction in which connections from and to the attendant trunk are made is not determinative of the characteristics of the connection, additional information must be provided by each of the circuits to which the attendant trunk may be connected. This additional information from each connecting point is obtained by the marker to develop appropriate pad control signals and to select the path for their application to the attendant trunk to enable it to control the insertion or deletion of its attenuation pad.

The second broad category of trunk with which the marker cooperates includes intraoffice trunks and private network intertoll type trunks and incoming and outgoing toll connecting and interoffice trunks each of which includes pad switching circuitry and a type of attendant trunk which, while not itself possessing a switchable attenuation pad, may yet effect the automatic switching of attenuation pads in circuits to which it may be connected. The new type of intraoffice trunk resembles in some of its aspects the attendant trunks of the first caegory because it also is capable of receiving pad control information via two appearances although the two appearances in this case are both on the trunk link frame. The information thus received on the seizures of its separate appearances is coordinated to appropriately control the switching of its attenuation pad. Under certain calling conditions when the intraoffice trunk is connected to the aforementioned attendant trunk, it will switch its pad in accordance with the characteristics of the trunk or line to which the attendant trunk is connected because the attendant trunk will indicate these characteristics by the particular one of its line link frame appearances which it makes available to the intraoffice trunk.

It is another aspect of the present embodiment that comparing circuits are utilized in the marker, in the latter-mentioned type of intraoffice trunk, and in the first-mentioned of the two types of attendant trunks without interferring with dial pulsing requirements. In the marker the comparing circuit determines from the marks exhibited at the line link and trunk link frame appearances of the circuits being interconnected whether either or both of these circuits contains a switchable pad. In the intraoffice trunk the comparing circuits perform a similar function in response to the signals furnished it by the marker although in this case the significance of one of the indications furnished it by the marker is that the circuit (on the line link frame) to which the intraoffice trunk is connected is entitled to VNL transmission quality. In both the case of the attendant trunk and of the intraoffice trunk the characteristics of the circuits being compared are those of the trunk seizing the intraoffice or attendant trunk and of the circuit thereafter seized by the intraoffice or attendant trunk. Since the circuits are connected at different times, both the attendant and intraoffice trunks contain registering relays for recording the transmission characteristics of the seizing trunk for use in comparison later with those of the trunk subsequently seized.

When, as mentioned above, tie trunks of the first category are being connected together, the code point and route relay combination selected by the calling information are screened against the rate treatment of the originating tie trunk to select a route series relay. The route series relay provides pad control signals both to the originating tie trunk and to the called tie trunk. Since they are both of the same category, they each respond to the pad control signal by switching out the pad. Thus the communications channel includes no pads and operates at VNL through the office. On the other hand, even though the originating tie trunk has pad control capability, as indicated by its rate treatment, the calling information transmitted over this trunk may be such as to designate a code point and route relay for a short-haul tie trunk which though impedance-compensated does not possess a pad control circuit. Thus, though screening by rate treatment may take place, a different route relay is screened and therefore a different route series relay than that mentioned above will be operated. Pad control is, in effect, considered but rejected by the marker. Under these conditions, the originating tie trunk will not receive a pad control signal, and it will therefore allow its attenuation pad to remain in the communications channel. Thus, although different trunks may be used in the process of being connected together and although these trunks may utilize the pad control information differently, the same signal path through the line link and trunk link frames may be utilized.

According to another aspect of the operation of the illustrative embodiment, transmission compatibility on connections between private network trunks of the second category and the toll message (common carrier) network is improved by the elimination of unnecessary attenuation pads. Because of the large number of toll message network trunks, the route relays for each of which would have to be screened against the rate treatments of each of the tie line trunks, the rate treatment screening procedure described above for interconnections among private network tie lines cannot economically be utilized on interconnections between private network tie trunks and toll message network trunks. On connections between tie trunks of the first category and the toll message network, therefore, no pad control signals are transmitted by the marker and the normally-in attenuation pad of the private network trunk is allowed to remain in the communications connection although not required. This leads to a simplification in marker signaling to the tie trunks because providing them with a normally-in pad means that for the majority of calls handled (tie trunk through intraoffice trunk to station) the attenuation pad is properly included in the circuit. Even when the private network tie trunk is connected to a toll message network trunk and the pad is left in the communications circuit, the transmission degradation is far less than is encountered in the direct connection of station lines to toll trunks because of the superior transmission characteristics of private network tie lines.

Transmission compatability between private network and toll message network trunks is improved when trunks of the second category are being switched by providing all trunks of the second category with a trunk link frame signaling and control circuit to the marker and by providing some of these trunks with a line link frame signaling and control or group class indicating circuit, as well. The signaling and control circuit for a calling trunk (whether the signaling and control circuit of the line link or trunk link frame is used depends on the class of call) and the group class of service indication for a calling line furnish the marker the preliminary indication whether to consider exercising pad control signaling on the ensuing connection. A similar indication furnished by the called trunk enables the marker to confirm or reject the preliminary indication furnished by the calling trunk.

The signaling paths through the trunk link frame that are provided for controlling pads in a trunk connected to the trunk link frame are also utilized by the attendant trunk of the second category even though this trunk does not itself have pad switching capability. When a connection is established from a line or a trunk on a line link frame to the trunk link frame appearance of the attendant trunk of the second category, the group class of service indication provided by the circuit on the line link frame together with the signaling path to the attendant trunk enables the marker to consider whether a pad control signal should be generated or not. If such a signal is generated, it is confirmed by the indication from the attendant trunk and the marker transmits a "pad control" signal to the attendant trunk. The attendant trunk utilizes this pad control signal to select one of its two appearances on the line link frame. The appearance selected is the one having the same group class of service as that of the circuit originating the connection to the attendant trunk. Thereafter, when the attendant extends the connection from his line link frame appearance in accordance with the information furnished by the originating circuit, the line link frame appearance will provide the marker with an indication whether to consider exercising pad control over the called trunk. And the marker, utilizing the same pad control circuitry as it used to control the attendant trunk, will apply pad control signals to the called trunk. In this manner, the attendant trunk reflects to the called trunk the transmission quality classification of the calling trunk or line without itself introducing any attenuation in the communications channel.

Accordingly, it is a feature of the present invention to provide controllable pads in trunks capable of carrying calls originating from or terminating to both VNL and non-VNL links and to control these pads by a marker without interferring with dial pulse transmission through the trunks.

It is another feature of the present invention for the marker to register a preliminary indication from the calling line or trunk which enables the marker to consider exercising pad control over the ensuing connection.

It is a still further feature that the marker be provided with means to control the pads in either or both of the calling and called trunks.

It is yet another feature that the marker be enabled to confirm or reject the preliminary pad control indication responsive to an indication obtained from the called line or trunk.

Figure 2:
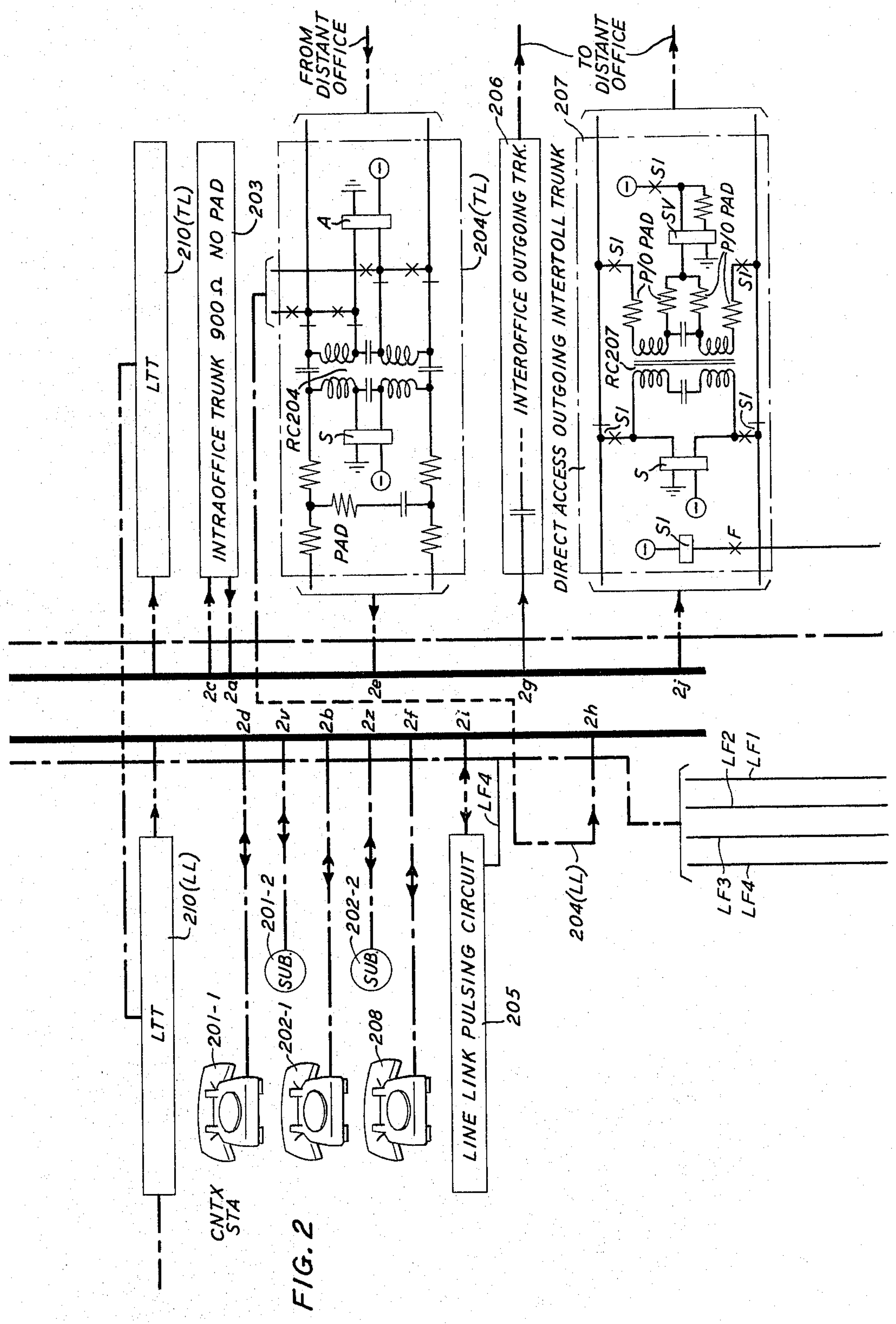
Figure 7:
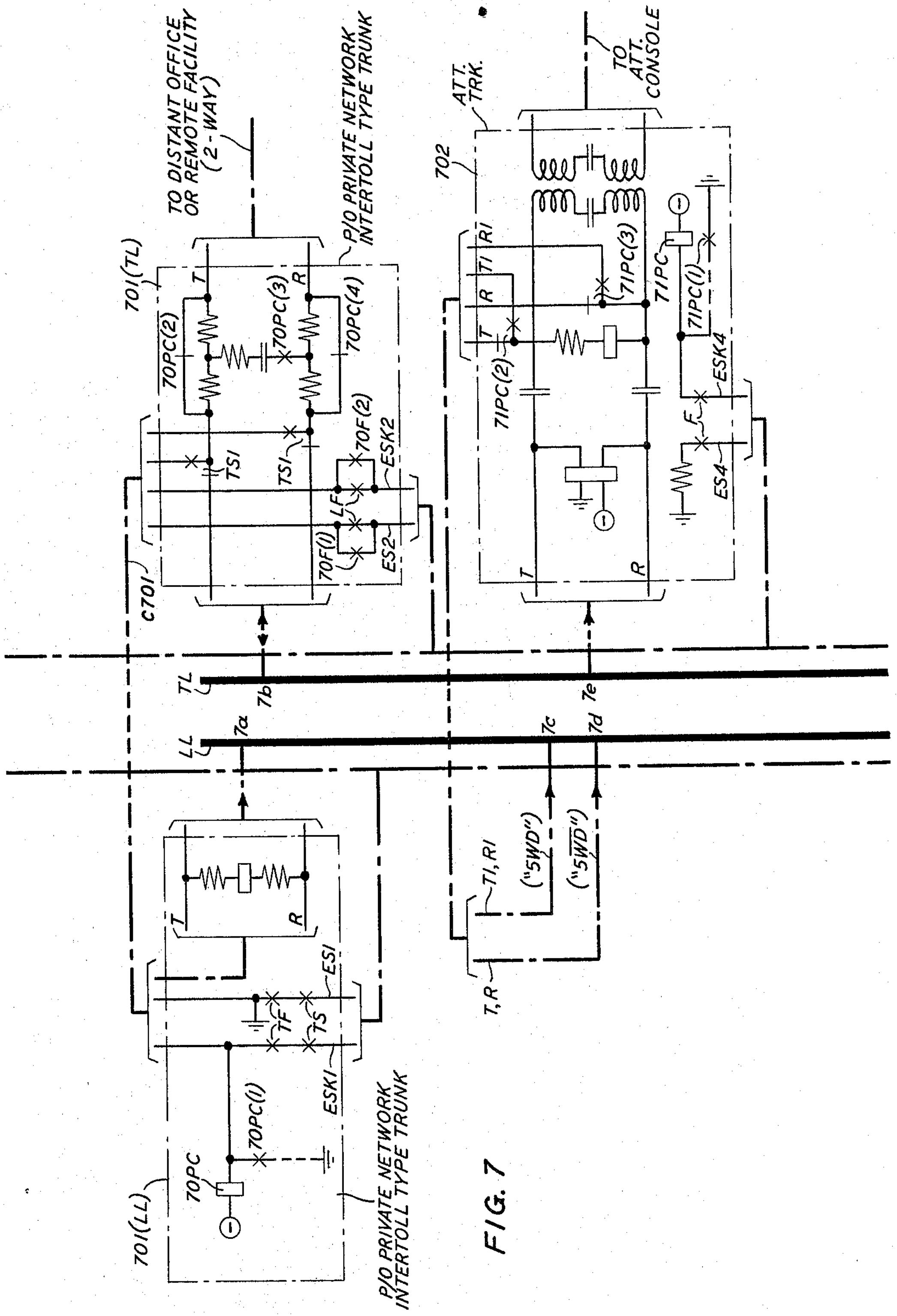
Figure 8:
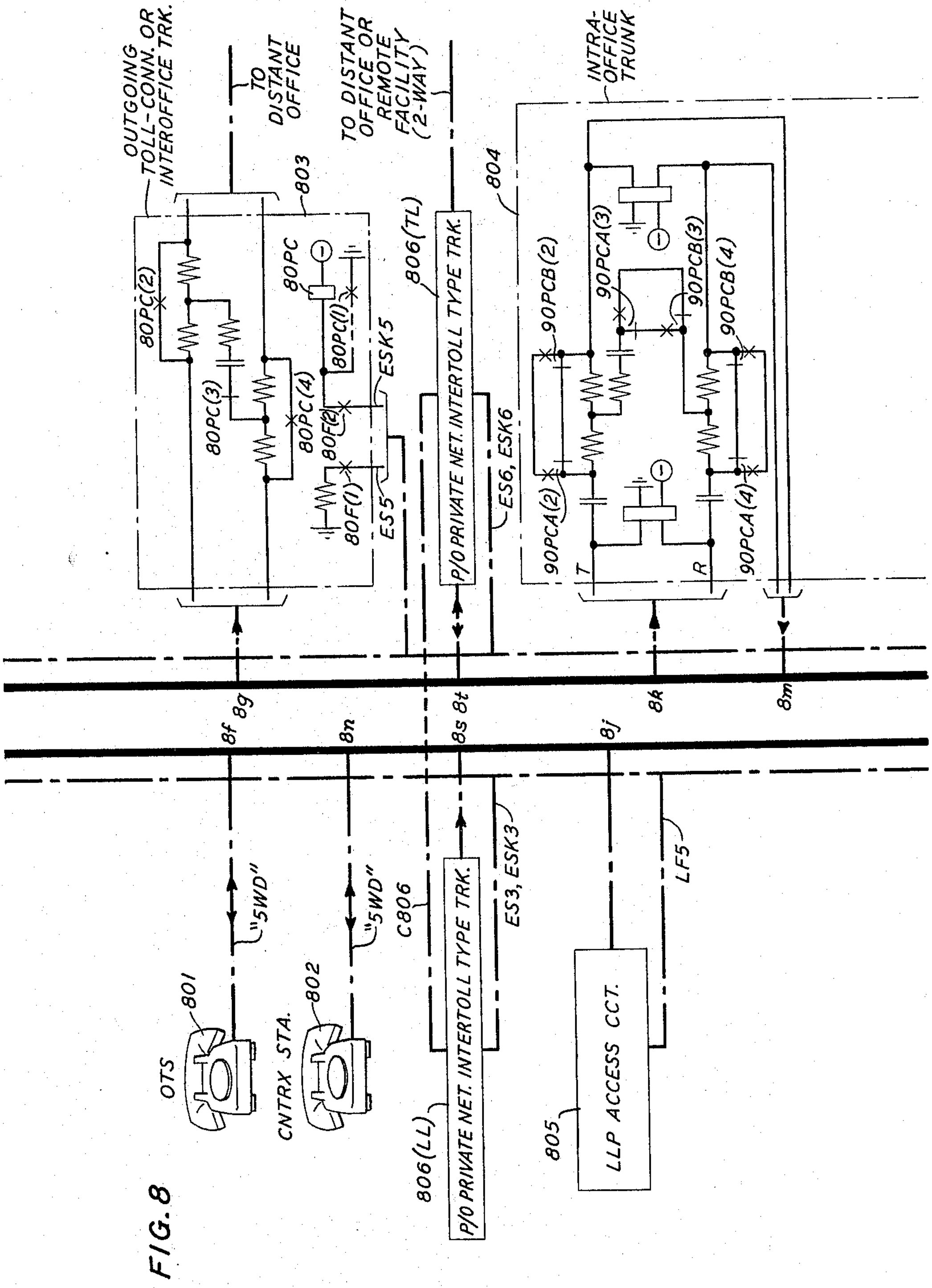
Figure 9:
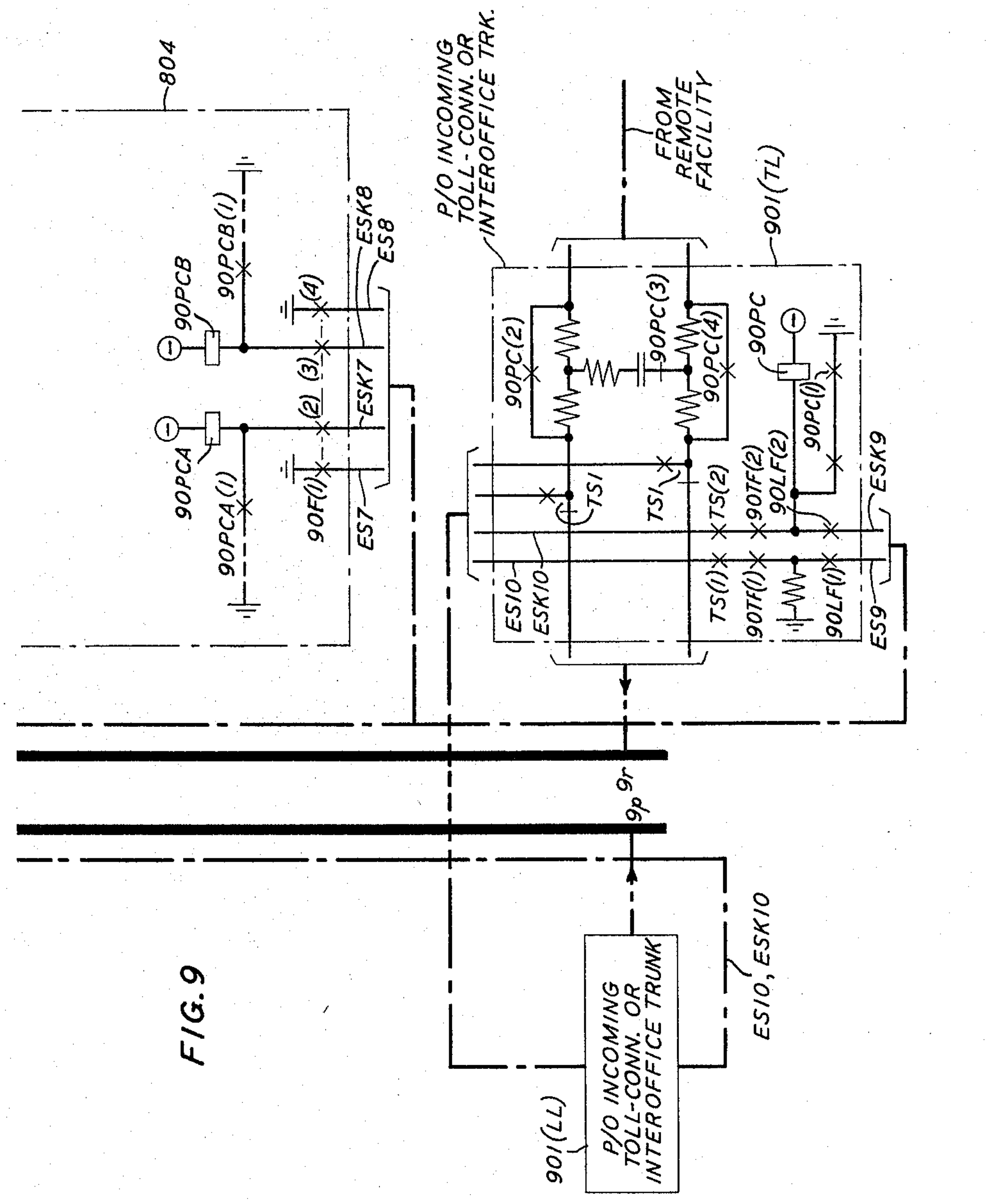
Figure 10:
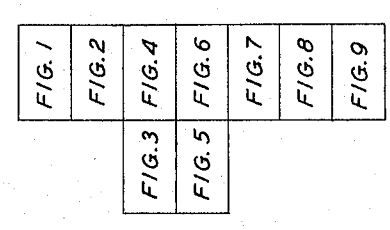

The foregoing and other objects and features may become more apparent by referring now to the following detailed description and drawing in which:

FIGS. 1 and 2 show the line circuits and trunks of the first category connected to line link and trunk link frames;

FIGS. 3, 4, 5, and 6 show portions of the marker and of the line link and trunk link and connector circuits;

FIGS. 7, 8, and 9 show the line and trunk circuits of the second category connected to line link and trunk link frames; and FIG. 10 shows how FIGS. 1–9 shall be arranged with respect to each other.

CONTENTS

Column
Long-Haul Tie Trunk to Station Call ............ 9
Station to Long-Haul Tie Trunk Call ............ 10
Long-Haul Tie Trunk to Short-Haul Tie Trunk Call ... 12
Long-Haul Tie Trunk to Long-Haul Tie Trunk Call ... 12
Long-Haul Tie Trunk Calling Attendant Trunk ..... 13
Short-Haul Tie Trunk Calling Station ............ 16
Short-Haul Tie Trunk Calling Long-Haul Tie Trunk ... 16
Miscellaneous Circuit Aspects (FIGS. 1 through 5) ... 17
Pad Control of Second Category Trunks ........... 18

In FIGS. 1, 2, 7, 8, and 9 the line link and trunk link frames are schematically depicted by the bold vertical lines. The line link and line link connector circuit for the line link frame of FIGS. 1 and 2 is shown in the upper left portion of FIG. 4 and the trunk link and trunk link connector circuit for the trunk link frame of FIGS. 1 and 2 is shown in the upper right portion of FIG. 4. Similarly, the line link and line link connector circuit and the trunk link and trunk link connector circuit for the line link and trunk link frames of FIGS. 7, 8, and 9 are shown in the lower left and lower right portions of FIG. 6.

The connections that may be established between line link and trunk link frames will be indicated by referring to the letter designations opposite the line link and trunk link frame appearances of the circuits between which the connections are established. For example, in FIG. 2, a connection to CENTREX station 202–1 from CENTREX station 201–1 via intraoffice trunk 203 is established by means of linkage 2*a*, 2*b* and 2*c*, 2*d*. On the other hand, a call to station 202–1 arriving over incoming trunk 204 (which can be considered to be either a toll or tandem trunk) is effected via linkage 2*e*, 2*d*. To simplify the drawing, the actual linkages between line link and trunk link frames are omitted and the following table may be referred to as a summary of the connections hereinafter to be described in fuller detail. In the ensuing description it should be noted that certain trunks are equipped both with line link and trunk link frame appearances. For convenience certain circuitry has been grouped in the line link frame portion and other portions of the circuitry have been grouped in the trunk link frame portion of the trunk. In the drawing the line link frame "portion" of a trunk is indicated by the appellation (LL) and the trunk link frame "portion" of the trunk by the appellation (TL) following the basic trunk identifying reference number.

*Table 1*

| Representative Linkage | Description of Call | Attenuation Pad | Remarks |
|---|---|---|---|
| | Station 201–1 calling: | | |
| 2*a*, 2*b* and 2*c*, 2*d* | Station 202–1 via intraoffice trunk 203 | None | |
| 2*d*, 1*m* | Long-haul tie trunk 102–1 | In | |
| 2*d*, 1*l* | Short-haul tie trunk 101 | None | |
| 2*d*, 2*j* | Outgoing intertoll trunk 207 | Out | But RC207 pad in. |
| | Incoming trunk 204 calling: | | |
| 2*e*, 2*b* | Station 202–1 | None | |
| 2*h*, 2*j* | Outgoing intertoll trunk 207 | Out | RC207 pad out. |
| | Long-haul tie trunk 102–1 calling: | | |
| 1*n*, 1*s* | Long-haul tie trunk 102–2 | Out | |
| 1*n*, 1*l* | Short-haul tie trunk 101 | Out | |
| 1*n*, 2*g* | Interoffice trunk 206 | In | |
| 1*n*, 2*j* | Intertoll trunk 207 | In | RC207 pad in also. |
| 1*n*, 2*c* and 2*a*, 2*b* | Intraoffice trunk 203 and extended to station 202–1. | In | |
| | Long-haul tie trunk 102–1 calling: | | |
| 1*n*, 1*p* and: | Attendant trunk 103 and extended to: | | |
| 1*r*, 1*s* | Long-haul tie trunk 102–2 | Out | |
| 1*r*, 1*l* | Short-haul tie trunk 101 | Out | |
| 1*r*, 2*g* | Interoffice trunk 206 | In | |
| 1*r*, 2*c* and 2*a*, 2*b* | Intraoffice trunk 203 further extended to station 202–1. | In | |

Referring to FIGS. 1 and 2 of the drawing, some of the connections summarized in the above table may now be illustrated more clearly. For example, a call may arrive over short-haul tie trunk 101 for station 201–1 in which case a linkage would be set from the line link frame appearance 1*k* of short-haul tie trunk 101 to the called (incoming) appearance 2*c* (FIG. 2) of intraoffice trunk 203. A linkage would also be set from appearance 2*a* of intraoffice trunk 203 to the line link frame appearance 2*d* of the called station 201–1. On the other hand, had station 201–1 initiated a call to a remote facility (not shown) at the distant end of short-haul tie trunk 101, (FIG. 1) the linkage would be set from 2*d* on the line link frame to 1*l* on the trunk link frame.

The tie line trunks, both short-haul and long-haul of FIG. 1, have appearances on both the line link and the trunk link frames as does the incoming tandem trunk 204 in FIG. 2. While the incoming tandem trunk 204 can terminate to a circuit on the line link frame directly from its trunk link frame appearance 2*e*, the tie line trunks carrying calls incoming to the central office herein depicted establish connections to other circuits via their line link frame appearances. Their trunk link frame appearances are the inputs by means of which these tie line trunks are reached by other circuits. An incoming tie line trunk carrying a call must first be connected to an originating register (not shown) as if the incoming tie line trunk were an originating line. When the originating register is connected to the incoming tie line trunk, dial tone is returned via the tie trunk to its distant calling end. This so-called "second dial tone" which the calling subscriber receives is his signal to dial the usual station number digits of the desired station. On the other hand, on a call incoming over tandem incoming trunk 204, no second dial tone is involved because the called directory number is entered directly into an incoming register (not shown). This difference in the manner of call completion between tie line trunks and incoming tandem trunks is one of the reasons why maintenance of transmission quality has heretofore constituted a perplexing aspect of private network switching operations, the resolution of which forms a principal object of the present invention as will hereinafter become more fully apparent.

To illustrate the above-mentioned difference in which calls are handled, let it be assumed that short-haul tie trunk 101 carrying a call to attendant trunk 103 would have linkage set from appearance 1*k* to appearance 1*p*. On the other hand, if attendant trunk 103 initiates a call involving short-haul tie trunk 101, linkage would be set from appearance 1*r* on the line link frame to appearance 1*l*. The long-haul tie trunk 102–1 has a line link frame appearance 1*n* which corresponds generally to line link frame appearance 1*k* of short-haul tie trunk 101 and a trunk link frame appearance 1*m* which corresponds to the trunk link frame appearance 1*l* of the short-haul tie trunk. Assuming that both short-haul tie trunk 101 and long-haul tie trunk 102–1 are assigned to the same PBX telephone customer, the following differences in their operation are also to be noted. First, since short-haul tie trunk 101, as its name implies, extends to a comparatively nearby facility sufficient provision for transmission balance may be made by resorting to impedance compensation of the transmission line extending to the remote facility. Long-haul tie trunk 102–1, however, extends to a switching facility which is located at a considerable distance from the central office in which the line link and trunk link frames of FIGS. 1 and 2 are depicted. Accordingly, when tie trunk 102–1 is connected to another trunk, a built up connection of very great length may be effected and transmission quality considerations become important. For this purpose, long-haul tie trunk 102–1 contains a switchable 2 db attenuation pad consisting of the series sections 13 and 14 and the shunt sections 15 and 16. The insertion and deletion of the 2 db attenuation pad in the communications connection, i.e., the T and R leads to and from the remote facility (not shown), is under the control of relay 10PC. When relay 10PC is operated, its make contact 10PC(1) short-circuits the series section 13 and its make contact 10PC(3) short-circuits the series section 14, and its back contact 10PC(2) open-circuits shunt sections 15 and 16. The attenuation pad is thus effectively removed from the circuit.

When long-haul tie trunk 102–1 is carrying a call which requires trunk 102–1 to be connected to another trunk, trunk relay 10TR (not shown) maintains its transfer contacts 10TR(1) and 10TR(2) normal so that the tip and ring are extended to the line link appearance 1*n*. The operating winding for relay 10TR and its control path is not described herein being unnecessary to the understanding of the instant invention. Suffice it to say that relay 10TR is operated under conditions obtaining when tie trunk 102–1 is seized for use on an outgoing call in which case linkage will be set to appearance 1*m* on the trunk link frame from some calling circuit on the line link frame.

*Long-haul tie trunk to station call*

Let it be assumed that long-haul tie trunk 102–1 is seized by its remote facility (not shown). The seizure causes a dial tone connection to be set up from line link appearance 1*n* to an originating register (not shown) in the same manner as if the long-haul tie trunk were a subscriber's line, as described in A. J. Busch Patent 2,582,904. The remote facility receives "second dial tone" and dial pulses the directory number digits of the called number. These digits are registered in the originating register and together with other information such as the class of service and equipment location of the calling line (which in this case is a trunk) are transferred to the circuits of the marker (not shown) for completion of the call. The marker translates the office code portion of the directory number digits to ground one of the code points shown on the left-hand side of FIG. 3. If the call incoming over long-haul tie trunk 102–1 is to one of the stations appearing in the same telephone office, code point LPA will be grounded and relay 3LPA will operate. Relay 3LPA operates and, in turn, operates route relay RT203 to designate the route for intraoffice trunks, one of which, i.e., trunk 203, is shown in FIG. 2.

Figure 4:
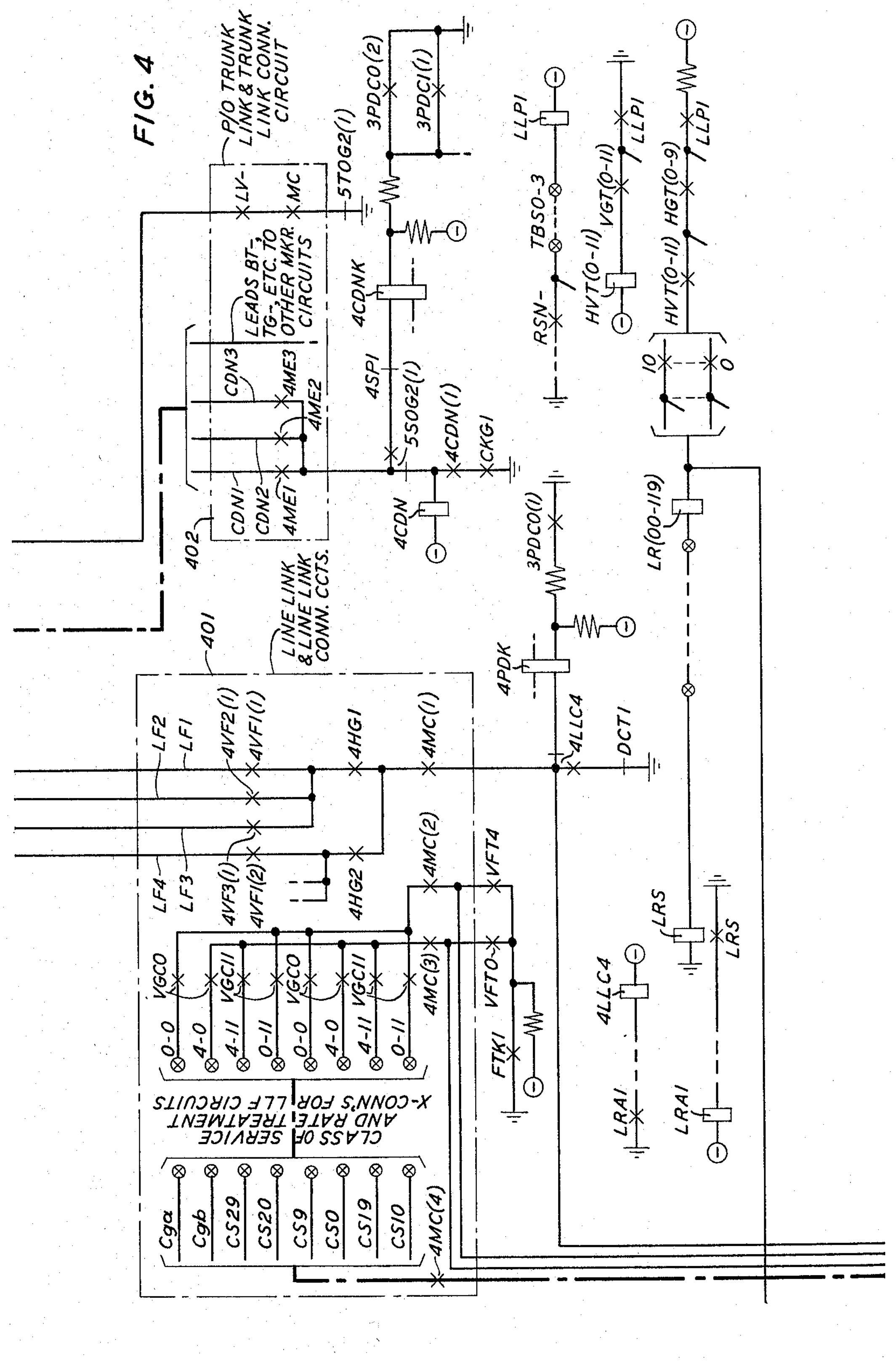
Figure 5:
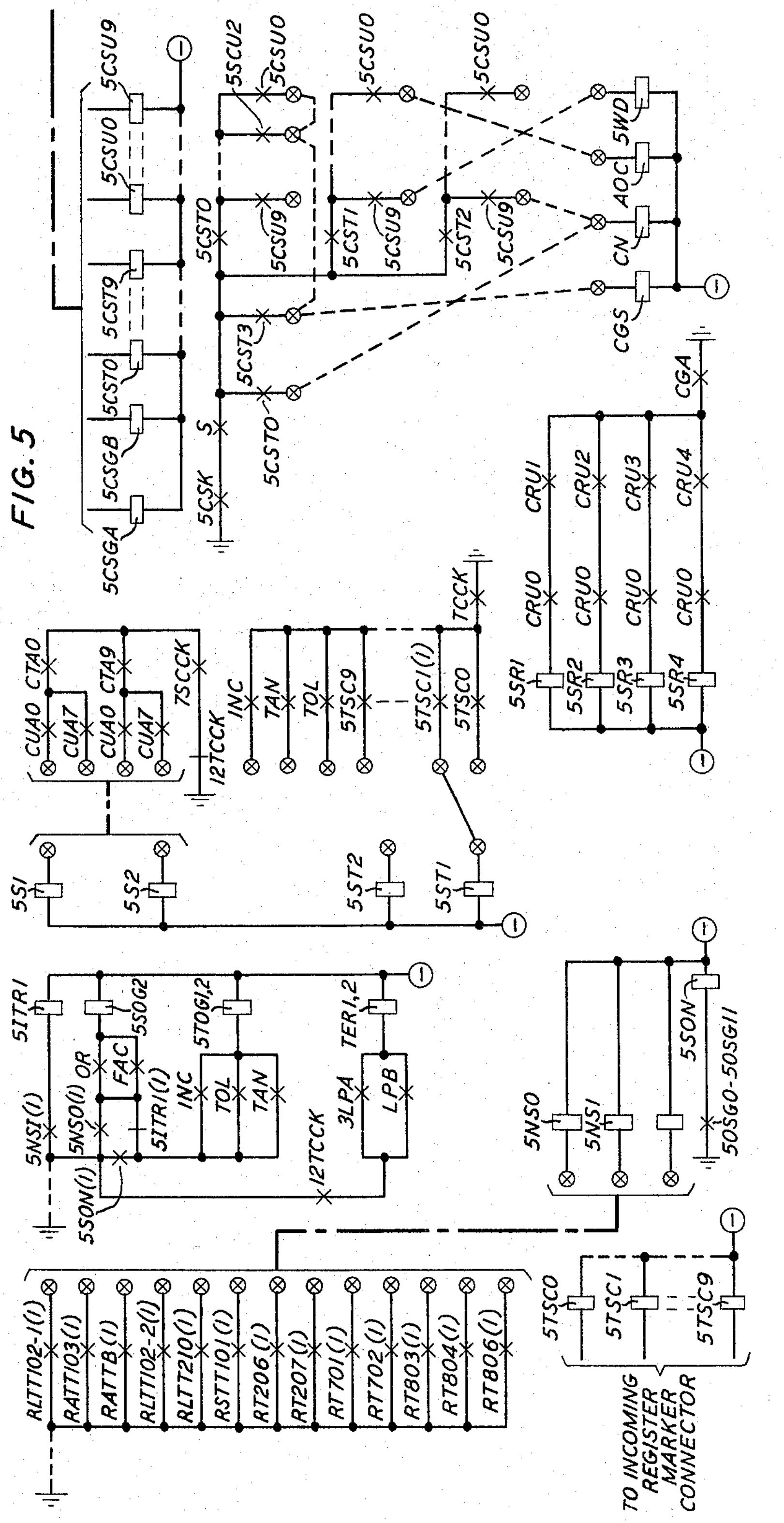
Figure 6:
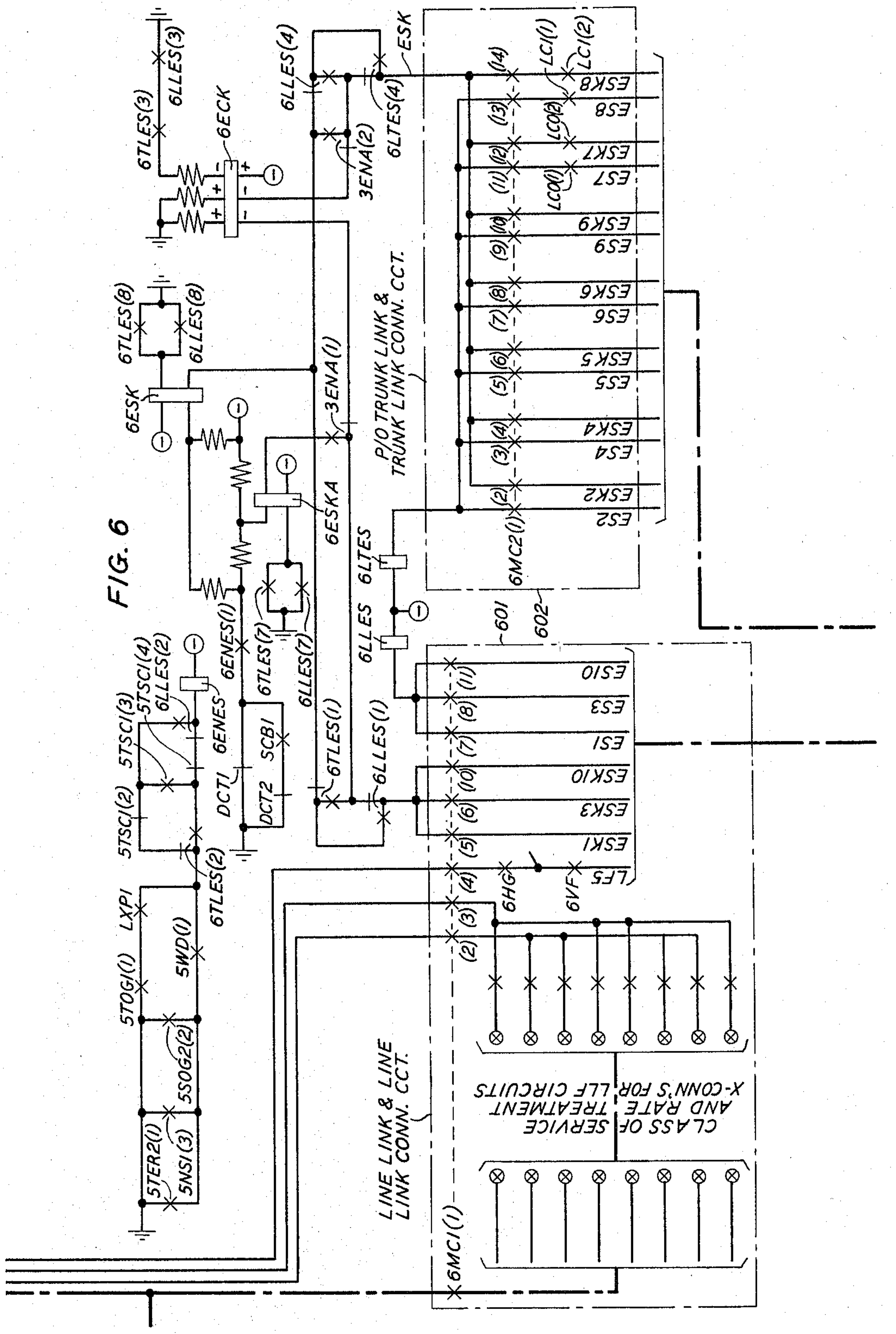

At the same time that the above-referred-to dial tone connection was set up, the class of service of the calling appearance of the long-haul tie trunk as determined by the cross-connections in the line link and line link connector circuit 401 (FIG. 4) was registered in the originating register (not shown). The originating register passed this class of service and rate treatment information to the completing circuits of the marker, portions of which are shown in FIG. 5. The registration of the rate treatment and class of service in the call completing circuits of the marker is described in extensive detail in the copending application of Fisher et al., Serial No. 191,507, and will only briefly be summarized herein. For example, let the class of service of calling long-haul tie trunk 102–1 be indicated by the originating register operating contacts CTA0 and CUA0 in the marker (FIG. 5) and let the rate treatment be indicated by the operation of contacts CRU0 and CGA. The windings (not shown) corresponding to these just-mentioned contacts are directly operated by the originating register through the originating register marker connector (both not shown) as described in the Fisher et al. application. The operation of contacts CTA0 and CUA0 completes an operating path for relay 5S1 which may be traced from ground, back contact 12TCCK, make contact 7SCCK, make contacts CTA0 and CUA0. Contacts of relay 5S1 screen the code points shown in FIG. 3 to steer the ground thereon to one of the route relays. To simplify the drawing, the screening is omitted for code point LPA.

In the aforementioned operating path of relay 5S1, relay contacts 7SCCK are contacts of a correspondingly designated check relay whose winding (not shown) is energized, as described in the above-mentioned Fisher et al. application, when the class of service indication of a circuit on the line link frame is received. Contacts 12TCCK (also shown therein) remain unoperated at this time since the 12TCCK check relay (not shown) is energized only when class information is received by the marker from a circuit on a trunk link frame.

Figure 3:
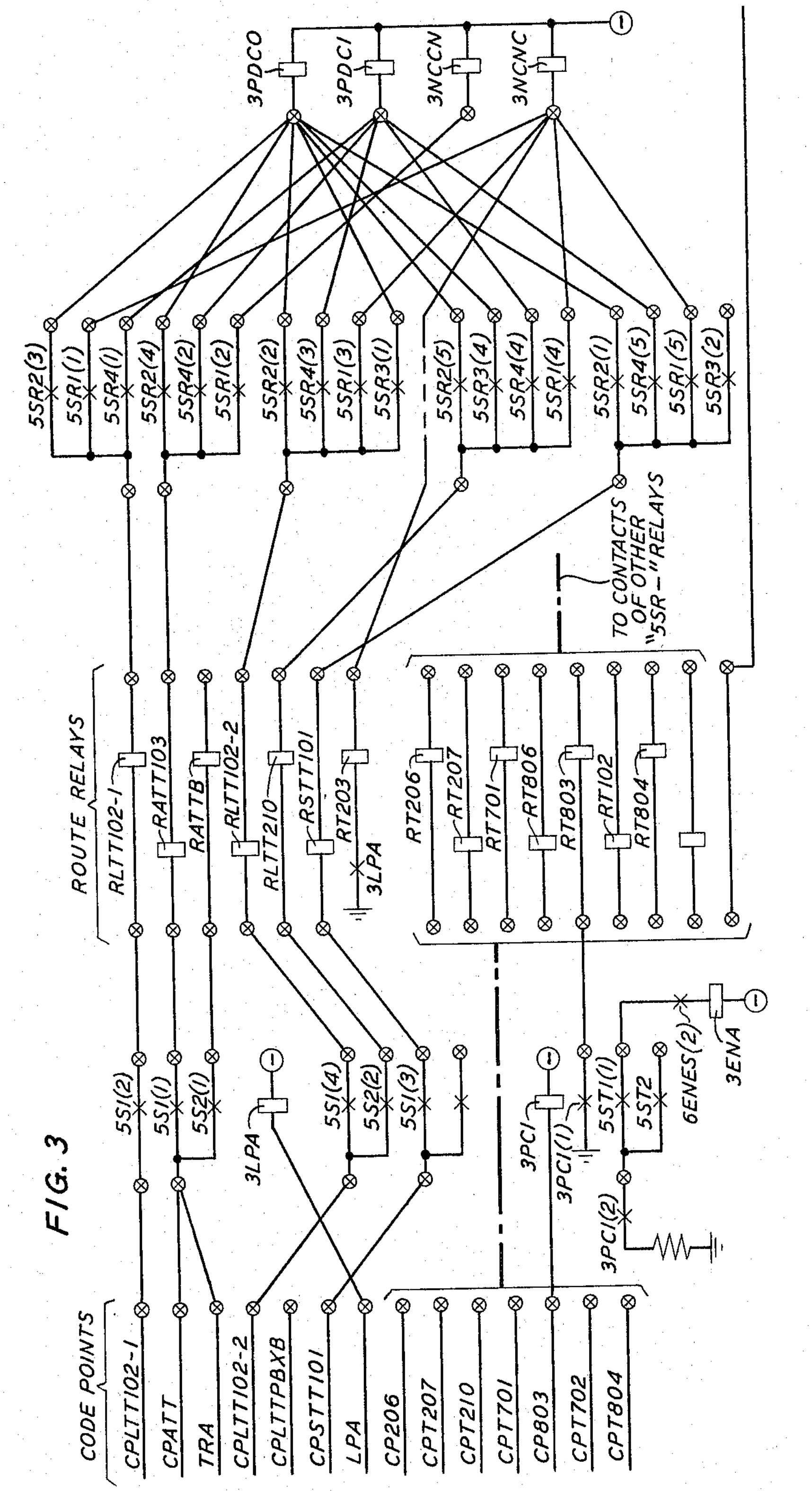

Returning now to the description of an intraoffice call arriving over tie trunk 102–1, the marker functions in the normal manner to set up call-forward linkage 2*a*, 2*d* and call-back linkage 2*c*, 1*n*. Referring to FIG. 3, it will be seen that there is no path from the winding of relay RT203 to either relay 3PDC0 or 3PDC1 and both these relays remain normal on this type of call. Since neither relay 3PDC0 nor relay 3PDC1 is operated, make contacts 3PDC0(1), FIG. 4, remain open and do not shunt down the resistance battery which is applied through the winding of relay 4PDK, the back contact 4LLC4, make contact 4MC(1), make contact 4HG1, make contact 4VF1(1), and lead LF1 to long-haul tie trunk 102–1. Resistance battery applied to lead LF1 does not operate relay 10PC which remains normal permitting the 2 db attenuation pad to remain in the communications connection. The communications connection thus extends from the remote facility through the line link portion 102–1(LL) of tie trunk 102–1 over leads T and R, through the 2 db attenuation pads 13, 14, 15, and 16, back contacts 10TR(1) and 10TR(2), appearance 1*n* through the line link frame to trunk link frame linkage (not shown) to appearance 2*c* of intraoffice trunk 203, through trunk 203 and appearance 2*a* to appearance 2*d* of station 201–1.

*Station to long-haul tie trunk call*

Thus, it is seen above that on a station terminated call involving a long-haul tie trunk the 2 db attenuation pad is allowed to remain in the normally-in-circuit condition in the long-haul tie trunk. The attenuation pad also remains in the communications connection when a station in the office depicted, such as station 201–1, originates a call to a long-haul tie trunk such as trunk 102–1. The establishment of a dial tone connection from station 201–1 to an originating register (not shown) proceeds in the normal manner described in the above-mentioned Busch Patent 2,582,904. The class of service and rate treatment assigned the calling station 201–1 is registered in the originating register and transferred by the originating register to the call completing circuits of the marker, portions of which are shown in FIG. 5. Let it be assumed that station 201–1 belongs to the same customer group as tie trunk 102–1. It will therefore be assigned the same class of service which indicates the particular customer group. Accordingly, make contacts CTA0, CUA0, CGA, CRU0, and CRU1 will be operated by the transfer of information from the originating register (not shown). The translation of the called number information provided by the originating register will result in the grounding of code point CPLTT102–1 at the left-hand side of FIG. 3. The operation of contacts CTA0 and CUA0 results in the operation of relay 5S1, as before. Contact 5S1(2) in FIG. 5 connects code point CPLTT102–1 to one end of the winding of route relay RLTT102–1. The operation of make contacts CGA, CRU0, and CRU1 operates relay 5SR1 (FIG. 5). Relay 5SR1 operated, at its make contact 5SR1(1), connects the other end of the aforementioned route relay to the winding of relay 3NCNC.

The selection of an idle trunk in the trunk group indicated by the operation of a route relay is described in detail in the above-mentioned Busch Patent 2,582,904. To simplify the drawing, only one trunk, i.e., trunk 102–1, is illustrated for the group of trunks designated by the operation of route relay RLTT102–1 (FIG. 5). Briefly, however, a work contact, such as contact RLTT102–1(1), of route relay RLTT102–1 (FIG. 5) is cross-connected to one of relays 5OSG0 through 5OSG11 and the operated one thereof, in turn, operates relay 5SON. Relay 5SON operated, at its make contact 5SON(1), operates relay 5SOG2 over the path ground, make contact 5SON(1), back contact 5ITR(1), and make contact OR. Relay 5SOG2, at the make contact of its transfer contacts 5SOG2(1), (FIG. 4) applies resistance battery made available over the winding of relay 4CDNK to lead CDN. Other work contacts (not shown) of route relay RLTT102–1 initiate a sequence of operations of the type described in the Busch Patent 2,582,904 which results in the seizure and operation of the trunk link connector relay 4ME1 of the trunk link and trunk link connector circuit 402 (FIG. 4). The present trunk link connector relay 4ME1 operated extends the resistance battery on lead CDN to lead CDN1. Lead CDN1 is associated with the trunk link frame portion 102–1(TL) of the called long-haul tie trunk 102–1 which is assumed to be the idle trunk that is seized in the group of trunks designated by the operation of route relay RLTT102–1. Relay 1OF is operated in the seized one of the idle trunks (trunk 102–1 illustrated) in the group of trunks indicated by the operation of route relay RLTT102–1. Relay 1OF, at its make contact 1OF(1), extends the resistance battery on lead CDN1 to the winding of relay 1OPC which is shown in the line link frame portion 102–1(LL) of the trunk. However, relay 1OPC does not operate and therefore the attenuation pad remains in the communications channel outgoing to the remote facility (not shown) at the distant end of trunk 102–1. Relay 1OTR is also operated over a path (not shown) incident to the seizure of the trunk link frame portion 102–1(TL) of the trunk by the operation of a contact (not shown) of relay 1OF.

In the normal manner of marker operation a linkage will be extended from line link frame appearance 2*d* of CENTREX station 201–1 to the trunk link frame appearance 1*m* of long-haul tie trunk 102–1, and thence over the T and R leads of cable C102–1, make contacts 1OTR(1) and 1OTR(2), the attenuation pads 13, 14, 15, and 16, to the T and R leads outgoing to the remote facility. Since neither relay 3PDC0 or 3PDC1 is operated, the resistance ground (FIG. 4) is not made available to lead CDN1 associated with the trunk link frame portion 102–1(TL) of trunk 102–1.

*Long-haul tie trunk to short-haul tie trunk call*

It will now be assumed that long-haul tie trunk 102–1 is seized by the remote facility to carry a call to a short-haul tie trunk 101 which is also dedicated for use by the same PBX customer who pays for the use of tie trunk 102–1. The seizure of tie trunk 102–1 by the remote facility initiates a dial tone connection in the same manner as described above. Directory number digits of the called short-haul tie trunk are dial pulsed into the originating register (not shown) and at the completion of dialing these directory number digits, as well as the information concerning the calling tie trunk 102–1, are passed to the completing circuits of the marker. This time, however, the code point grounded in FIG. 3 by the translation of the office code portion of the called directory number is code point CPSTT101. This code point is cross-connected to the class of service screening relays one of whose contacts 5S1(3) is operated and extends the ground to the winding of route relay RSTT101. The operating path of relay RSTT101 is completed by the closure of a contact of the rate treatment screening relay assigned to the calling long-haul tie trunk 102–1.

It will be recalled that trunk 102–1 is assigned rate treatment 2 so that make contacts CGA, CRU0, and CRU2 (windings not shown) will operate thereby completing an operating path to the winding of relay 5SR2. Contact 5SR2(1) closes through an operating path for relay RSTT101 in series with route series relay 3PDC0. Relay 3PDC0 operated, at its make contact 3PDC0(1) in FIG. 4, shunts down the resistance battery provided through the winding of relay 4PDK to lead LF. The resistance ground provided by the closure of contact 3PDC0(1) is extended over make contacts 4MC(1), 4HG1, and 4VF1(1) of the line link and line link connector circuit 401 to lead LF1 and operates relay 1OPC (FIG. 1). Relay 1OPC locks over its contact 1OPC(4) in series with a make contact of relay 1OBY (not shown). Relay 1OBY is a relay operated incident to the seizure of trunk 102–1 by the remote facility and remains operated unless the call is abandoned. Its operating path need therefore not be described herein in detail as any conventional circuit may be used to provide a locking ground for relay 1OPC so long as the call is held. Relay 1OPC operated, at its make contacts 1OPC(1) and 1OPC(3), shorts out the respective series sections 13 and 14 of the 2 db attenuation pad and at its back contact 1OPC(2) open-circuits the shunt portions 15 and 16. The communications path through trunk 102–1 thus extends from the remote facility over leads T and R and back contacts 1OTR(1) and 1OTR(2) to line link frame appearance 1*n*.

In the manner previously alluded to, work contacts (not shown) of route relay RSTT101 control the marker to establish a conventional communications connection from appearance 1*n* through the line link frame to trunk link frame linkage to trunk link frame appearance 1*p* of trunk 101. It is thus seen that in the connection established from a long-haul tie trunk to a short-haul tie trunk, the attenuation pad is removed from the circuit. This is permissible because it is assumed that the short-haul tie trunk is an impedance-compensated trunk and therefore exhibits at least an 18 db return loss. Under these conditions, the insertion of an additional 2 db pad would be unwarranted.

*Long-haul tie trunk to long-haul tie trunk call*

Let it now be assumed that long-haul tie trunk 102–2 has been seized by its remote facility and will carry a call to long-haul tie trunk 102–1. In the manner described above for long-haul tie trunk 102–1, long-haul tie trunk 102–2 is seized by its remote facility, a dial tone connection is established to an originating register (not shown), the digits of the access code are dial pulsed, and the originating register passes the called access code and the calling line information (in this case the class of service, rate treatment, and equipment location of the calling long-haul tie trunk 102–2) to the completing marker. Code point CPLTT102–1 (FIG. 3) is grounded by the translation of the access code. The ground on this code point is extended by the operated make contact 5S1(2) to the winding of route relay RLTT102–1. Relay 5S1 operates because it has been assumed that calling tie trunk 102–2 is dedicated to the same telephone customer as tie trunk 102–1. Both may therefore advantageously be assigned the same class of service resulting in the operation of make contacts CTA0 and CUA0 by the originating register to indicate to the marker that they are in the same customer group. Similarly, tie trunk 102–2 may be accorded the same rate treatment as tie trunk 102–1 and therefore relay 5SR2 will be operated and at its contact 5SR2(3) will complete an operating path for relay RLTT102–1 in series with relay 3PDC0. Relay 3PDC0 operates and at its make contact 3PDC0(1), shown in FIG. 4, provides resistance ground to the LF lead of line link and line link connector circuit 401. The ground on lead LF is extended over make contacts 4MC(1), 4HG1, and 4VF2(1) of the line link and line link connector circuit 401 to lead LF2. Lead LF2 is associated with the line link frame portion 102–2(LL) of trunk 102–2 in the same manner as lead LF1 was associated with the line link frame portion of trunk 102–1. The ground applied to lead LF2 operates the pad control relay in trunk 102–2 which removes the attenuation pad in the communications circuit incoming from the remote facility (not shown) at the distant end of trunk 102–2. The manner in which the relays that operate the above-mentioned contacts in the line link and line link connector circuit 401 are controlled by the marker is described in the above-mentioned Busch Patent 2,582,904. However, to make the significance of the various LF leads to the tie line trunks which have pad control more apparent, these leads have been steered over individual contacts of the "vertical file" 4VF– relays in circuit 401.

Relay 3PDC0 operated, at its make contact 3PDC0(2), shown in FIG. 4, provides resistance ground to lead CDN. The selection of an idle trunk in the trunk group indicated by the operation of route relay RLTT102–1 need not be described in detail again inasmuch as it is essentially similar to the manner in which an idle trunk in a designated trunk group is conventionally seized by the marker, as was previously indicated. The ground on lead CDN is accordingly extended over an operated make contact, such as contact 4ME1 of the trunk link and trunk link connector circuit 402, to lead CDN1. Ground on lead CDN1 is extended over make contact 1OF(1) in the trunk link frame portion 102–1(TL) of trunk 102–1 and cable C102–1 (FIG. 1) to operate relay 1OPC.

Thus, it is seen that on the call from long-haul tie trunk 102–2 to long-haul tie trunk 102–1, the grounding of lead LF2 removes the pad from trunk 102–2 and the grounding of lead CDN1 removes the pad from trunk 102–1. In this manner, the communications path extending from the remote facility (not shown) at the distant end of calling trunk 102–2 extends through the line link frame portion 102–2(LL) of the trunk to its line link frame appearance 1*t*, and thence over the line link frame to trunk link frame linkage (not shown) to the trunk link frame appearance 1*m* of the called trunk 102–1, over the T and R leads of cable C102–1, make contacts 1OTR(1) and 1OTR(2), make contacts 1OPC(1) and 1OPC(3), to the T and R leads outgoing to the remote facility (not shown) at the distant end of tie trunk 102–1.

*Long-haul tie trunk calling attendant trunk*

When long-haul tie trunk 102–1 has been seized by its remote facility (not shown) at its distant end, a dial tone connection as described above is completed but in this case the originating register is furnished the dial zero digit. The code point in FIG. 3 that is selected by the translation of the dial zero digit is code point CPATT. Relay 5S1 is operated as described above for other cases in which long-haul tie trunk 102–1 has been seized by its remote facility. Contact 5S1(1), FIG. 3, extends the ground on code point CPATT to one end of the winding of route relay RATT103. (Of course, had a tie trunk dedicated to a different telephone customer been carrying a call to an attendant trunk, its class of service registration would have operated a different one of the 5S– relays in FIG. 5. For example, a calling tie trunk whose class of service registration resulted in the operation of relay 5S2 would cause the ground on code point CPATT to be extended to a route relay appropriate to the group of attendant trunks serving the same customer as that to which the calling tie trunk is assigned. Such a tie trunk 210 is shown in FIG. 2 and if it were carrying a call to its attendant trunk (not shown), the ground on code point CPATT in FIG. 3 would be extended over make contact 5S2(1) to the winding of route relay RATTB.)

The other end of the winding or relay RATT103 is connected to relay 3PDC0 over make contact 5SR2(4). The operation of relay 3PDC0, at its make contact 3PDC0(1), in FIG. 4 causes ground to be applied to lead LF1 over the path through the line link and line link connector circuit 401, previously described. Ground applied to lead LF1 operates relay 1OPC in the line link frame portion 102–1(LL) of calling trunk 102–1. Relay 1OPC operated removes the attenuation pads 13, 14, 15, 16 from the communications path incoming from the remote facility to the line link frame appearance 1*n* of calling tie trunk 102–1. The operation of relay 3PDC0, at its make contact 3PDC0(2), applies an operating ground in FIG. 4 to lead CDN, in the manner previously described, and the ground on lead CDN is applied through the trunk link and trunk link connector circuit 402 to lead CDN3 associated with the trunk link frame portion 103(TL) of attendant trunk 103 in FIG. 1. The ground on lead CDN3 is applied over make contact 35F(1) to the winding or relay OPC which operates and locks to ground over its make contact OPC(1) in series with contact 35S1 of a relay whose winding (not shown) is operated when the trunk is seized and remains operated unless the call is abandoned. The marker in the manner described in the Busch Patent 2,582,904 operates responsive to the work contacts of the route relay to establish the appropriate linkage between the calling and called circuits. In this case, the linkage is established from the line link frame appearance 1*n* of calling tie trunk 102–1 to the called trunk link frame appearance 1*p* of attendant trunk 103. The communications path to the attendant is via the tip and ring leads, the trunk link frame appearance 1*p*, back contacts 35S1A and 35S1Z to the attendant console (not shown). The operation of the aforementioned contacts 35S1, 35S1A, 35S1Z, and of relay 35F (not shown) as well as the other portions of the attendant trunk circuit which have been omitted from this simplified rendition of the attendant trunk is described in the above-mentioned copending application of Fisher et al. The above-mentioned relay 35F in the present embodiment, however, is provided with the additional contact 35F(1) to prepare the operating path to relay OPC from the lead CDN3. Relay OPC operated, at its contacts in the line link frame portion 103(LL) of attendant trunk 103, inserts the attenuation pads 13′, 14′, 15′, 16′ at the line link frame appearance 1*r* of the attendant trunk preparatory to the extension of a communications channel from that line link frame appearance by the attendant. The pad, however, is not in a communications path from the remote facility to the attendant. When the linkage 1*n*, 1*p* is completed by the marker and the attendant is in conversation with the calling party at the remote facility with which tie trunk 102–1 is associated, the attendant receives information which enables her to complete the call. The attendant may complete the call to an outgoing tie trunk assigned to the same customer group as tie trunk 102–1 or she may complete the call to any other station or trunk having an appearance in the office. If the attendant desires to complete the call, line link frame appearance 1r is used. A calling condition is initiated at line link frame appearance 1r in the manner described in the above-mentioned Fisher et al. application and, depending upon the type of call being made, lead LF3 associated with the line link frame portion 103(LL) of the attendant trunk 103 may selectively be energized. For example, if the call is extended to long-haul tie trunk 102–2, relay 3PDC0 (FIG. 3) will be operated over the path extending from grounded code point CPLTT102–2, make contact 5S1(4), winding RLTT102–2, and make contact 5SR3(1). In this operating path attendant trunk 103 is assumed to have been assigned a rate treatment resulting in the operation of relay 5SR3 (FIG. 5). Advantageously, however, the attendant trunk may be assigned the same rate treatment as long-haul tie trunk 102–1 or 102–2, in which case the path from relay RLTT102–2 would have been completed to the winding of relay 3PDC0 over make contact 5SR2(2). The operation of relay 3PDC0 and of the make contacts 4MC(1), 4HG1, and 4VF3(1), FIG. 4, grounds lead LF3 and operates relay IPC in the line link frame portion 103(LL) of attendant trunk 103. Relay IPC operated locks over its make contact IPC(1) to the path provided by contacts OPC(1) and 35S1. Relay IPC operated, at its transfer contacts IPC(2), IPC(3), and IPC(4), removes the attenuation pad that was inserted by the prior operation of relay OPC. The communications channel thereafter established through the line link frame appearance 1r of trunk 103 to trunk link frame appearance 1s of tie trunk 102–2 is free of the attenuation pad.

Similarly, if the attendant extending the call from line link frame appearance 1r had directed that the call be made to short-haul tie trunk 101, the communications channel through line link frame appearance 1r of the attendant trunk to trunk link frame appearance 1l of the short-haul tie trunk would also be free of the attenuation pad. In this case, relay 3PDC0 in FIG. 3 would be operated over the path from ground to code point CPSTT101, make contact 5S1(3), relay winding RSTT101, and make contact 5SR3(2). Of course, if attendant trunk 103 is assigned the same rate treatment as trunk 102–1 or trunk 102–2, the path from relay RSTT101 to relay 3PDC0 may advantageously be completed over make contact 5SR2(1).

On the other hand, if the attendant extends the call from line link frame appearance 1r to intraoffice trunk 203, thereby to reach one of CENTREX stations 201–1, 201–2, etc., or to an ordinary telephone subscriber station 208 served by the central office depicted, neither relay 3PDC0 nor relay 3PDC1 will be operated and the attenuation pad that was inserted by the operation of relay OPC will be allowed to remain in the communications channel. The entire communications channel then may be traced from the remote facility through line link frame appearance 1n of trunk 102–1 to trunk line frame appearance 1p of attendant trunk 103, through cable C103, through attenuation pads 13', 14', 15', 16', to line link frame appearance 1r of attendant trunk 103, to trunk link frame appearance 2c of intraoffice trunk 203, to trunk link frame appearance 2a of intraoffice trunk 203, and thence to the line link frame appearances such as 2d, 2v, 2b, 2z, or 2f of any station line appearing in the central office depicted.

The attendant reached on the call arriving over long-haul tie trunk 102–1 may also be instructed to extend the call to interoffice trunk 206 outgoing to a distant office (not shown) or to intertoll trunk 207. In FIG. 3 the route relays RT206 and RT207 for these trunks have not been cross-connected to contacts of any of the 5S– or 5SR– relays, it being assumed that the operating path from the code point to the winding and from the winding to a route series relay may be accomplished in a conventional manner. Since this will not involve the operation of relays 3PDC0 or 3PDC1, the attenuation pads 13', 14', 15', 16' inserated by the operation of relay OPC in FIG. 1 will remain in the communications channel extended from the line link frame appearance 1r of trunk 103 to trunk link frame appearance 2g of interoffice trunk 206 or to trunk link frame appearance 2j of intertoll trunk 207. Inasmuch as the transmission quality characteristics of long-haul and short-haul trunks are inherently better than those of station lines such as 201–1, etc., or 208, the insertion of the attenuation pad on a connection between a long-haul tie trunk and an outgoing interoffice of intertoll trunk still does not reduce transmission quality to the level which customarily exists on direct interconnections between ordinary telephone subscriber stations such as 208 and either interoffice trunk 206 or intertoll trunk 207.

*Short-haul tie trunk calling station*

When short-haul tie trunk 101 has been seized by the remote facility (not shown) at its distant end and the office code portion of the called directory number has been translated, code point LPA in FIG. 3 is grounded to operate relay 3LPA. Operations proceed similarly to that described above for the case of a long-haul tie trunk calling a station, except that in this case linkage is established from the line link frame appearance 1k of the short-haul tie trunk. Neither relay 3PDC0 nor relay 3PDC1 is operated and since short-haul tie trunk 101 does not contain a switchable pad and since no pad switching signals are transmitted, no pad control takes place on this type of call.

*Short-haul tie trunk calling long-haul tie trunk*

When short-haul tie trunk 101 has been seized by the remote facility (not shown) at its distant end, code point CPLTT102–1 in FIG. 3 is grounded. Assuming that the class of service cross-connections in the line link and line link connector circuit 401 of FIG. 4 have assigned short-haul tie trunk 101 the same class of service number as long-haul tie trunk 102–1 and 102–2, relays 5CST0 and 5CSU0 in FIG. 5 will operate on the dial tone usage of the marker and, in turn, the originating register will effect the operation of contacts CTA0 and CUA0 to operate relay 5S1. Relay 5S1 operated, at its make contact 5S1(2), extends the ground on code point CPLTT102–1 to the winding of relay RLTT102–1. Tie trunk 101 in the cross-connections of the line link and line link connector circuit 401 (FIG. 4) is assigned a rate treatment to operate particular ones of relays 5CSGA, 5CST0–9, and 5CSU0–9 (FIG. 5) on the dial tone usage such that contacts CGA, CRU0, and CRU4 will in turn be operated when the originating register seizes the marker. These contacts operated, in turn, operate relay 5SR4. Thus, the rate treatment assigned tie trunk 101 distinguishes it as a short-haul tie trunk as opposed to the rate treatments assigned, for example, to long-haul tie trunks and rate treatments assigned to station lines. Relay 5SR4, at its make contact 5SR4(1), completes an operating path from relay RLTT102–1 to the winding of relay 3PDC1. Relay 3PDC1 operated, at its make contact 3PDC1(1), FIG. 4, provides an operating ground to lead CDN in similar fashion to that in which the operation of contact 3PDC0(2) grounded lead CDN. Also, the operation of route relay RLTT102–1 instituted a sequence of operations for the operation of relay 5SOG2, at whose contact 5SOG2(1), the ground made available at the winding of relay 4CDNK is applied to lead CDN. Ground on lead CDN is extended over make contact 4ME1 to lead CDN1 associated with the trunk link frame portion 102–1(TL) of the called long-haul trunk 102–1. The application of ground to lead CDN, as previously described, operates relay 1OPC of trunk 102–1 in FIG. 1 which removes the attenuation pad from the communications channel. Thus, in the linkage established through the line link frame appearance 1*k* of the short-haul trunk 101 to the trunk link frame appearance 1*m* of trunk 102–1 and extended through the T and R leads of cable C102–1 to the T and R leads outgoing to the remote facility from the line link frame portion 102–1(LL) of trunk 102–1 there is no attenuation pad.

When short-haul trunk 101 is carrying a call directed to an attendant trunk, operations proceed as described in the last-mentioned case except that the operating path in FIG. 3 for relay 3PDC1 extends from grounded code point CPATT over make contact 5S1(1) to one end of the winding of relay RATT103, and from the one end of the winding of this relay to the winding of relay 3PDC1 over make contact 5SR4(2). The ground applied to lead CDN is extended over make contact 4ME3, over trunk link and trunk link connector circuit 402 to lead CDN3.

*Miscellaneous circuit aspects (FIGS. 1 through 5)*

The operation of the circuits thus far described involving short-haul and long-haul tie trunks may conveniently be summarized at this point. Calls originating at or terminating to a station in the office depicted which involve the use of a long-haul tie trunk will have an attenuation pad inserted in the communications connection whether completing directly or via an attendant trunk. Calls between short-haul and long-haul tie trunks, on the other hand, will not include an attenuation pad. Relay 3PDC0 in FIG. 3 is operated on calls from a long-haul tie trunk to another long-haul tie trunk, to an attendant trunk, or to a short-haul tie trunk. Relay 3PDC1 is operated on calls from a short-haul tie trunk to a long-haul tie trunk, to another short-haul tie trunk, or to an attendant trunk.

In FIG. 4 it may be noted that the back contact of transfer contacts 4LLC4 is in the operating path to the various LF– leads of the line link frame appearances of the long-haul tie trunks at FIGS. 1 and 2. The make contact of transfer contacts 4LLC4 is shown only for the purpose of illustrating the relationship between the manner in which the LF leads are utilized in the present invention and that in which this lead may be utilized in the copending application of T. V. Burns et al., Serial No. 240,558. Similar remarks apply to the skeletonized operating path for the winding of relay 4LLC4 which involves the operations of relays LLP1, HVT(0–11), LR(00–119), LRS, and LRA1. Relay 4CDN and make contact 4CDN(1) and the make contact of relay CKG1 are shown associated with lead CDN and the back contact 5SOG2(1) to show the manner in which lead CDN may be utilized with the 4CDN relay, as described in the above-mentioned application of Fisher et al., Serial No. 191,507.

Trunks 204 and 207 are representative conventional trunks illustrated for the purpose of contrasting their performance on various possible connections with that of the long-haul and short-haul tie trunks of FIGS. 1 and 2. In both trunks 204 and 207 the pad is fixed in the trunks along with the repeat coil and is not controllable in accordance with the characteristics of the circuits and of the call being made. In trunk 204, for example, the pad will always be in the communications channel whenever the trunk completes to a circuit on the line link frame (terminating class call) regardless of the transmission requirements of that circuit. In trunk 207 the pad is only taken out of the circuit for tandem outgoing (tog) class calls and thus remains in even when the trunk is connected to a line link frame circuit which has its own attenuation pad. Repeat coil RC204 is provided in trunk 204 on terminating connections to match the 600 ohm impedance of the transmission facility incoming from the distant office of the 900 ohm impedance of circuits on the line link frame. When trunk 204 operates on tandem outgoing class calls, linkage is set from its line link frame appearance 2*h*. The transmission path is over the make contacts of the four sets of transfer relay contacts in trunk 204. The windings and control paths for these transfer relays, being conventional, are not shown. On tandem outgoing calls neither repeat coil RC204 nor the concommitant attenuation pad are in the circuit since both incoming and outgoing facilities are at 600 ohms and the through-switched connection is at VNL.

Direct access outgoing intertoll trunk 207 may be seized for use either by a station or by an incoming tandem trunk. When seized for use by a station, such as 201–1, for example, a subscriber outgoing (SOG) class of call is involved. Under these circumstances the trunk is operating in its direct subscriber access mode and repeat coil RC207 is included in the trunk to match the 600 ohm intertoll facility impedance to the 900 ohm station line impedance. This repeat coil is included in the circuit incident to the seizure of the trunk by the marker through trunk link and trunk link connector circuit 402. Ground provided over back contact 5TOG1(1) in the marker (FIG. 4) operates relay S1 in trunk 207. Contacts of relay S1 connect the repeat coil as well as the usual supervisory relays S and SV in the circuit. On the other hand, should trunk 207 be seized by an incoming tandem trunk such as trunk 204, marker relay 5TOG2 will be operated because a tandem outgoing class of call is being made. Under these circumstances operated contact 5TOG2(1) removes the ground path to trunk relay S1 because the repeat coil RC207 is not needed to match the 600 ohm impedance of the incoming tandem trunk line link frame portion 204(LL) to the 600 ohm impedance of the toll facility associated with trunk 207. The above discussed transmission problems associated with the use of conventional trunks 204 and 207 are obviated by the marker control of the second category trunks now to be described.

*Pad control of second category trunks*

In FIGS. 7 through 9, one of each of the second category attendant, outgoing toll connecting or interoffice, intraoffice, and incoming toll connecting or interoffice trunks are shown. Two of the second category private network intertoll type trunks are shown so that intertoll-to-intertoll connections may be more clearly described. The first private network intertoll type trunk is shown in FIG. 7 (trunk 701) and the second is shown in FIG. 8 (trunk 806). Trunks 701 and 806 are designated intertoll type trunks because they may, advantageously, be assigned either to the common carrier network or to specific telephone customers for use in private network switching connections. Trunks 701 and 806 may therefore advantageously be standardized as 900 ohm trunks whether used as intertoll or private network trunks and therefore need not employ impedance matching devices such as repeat coils which tend to reduce return loss. In this manner, they differ from conventional intertoll trunks which are usually standardized at 600 ohms and which must employ repeat coils on certain connections. When connections are made between one of these intertoll type trunks assigned as part of a private network switching system and another of these same type trunks which is employed as an intertoll trunk in the message network (common carrier) switching system, there will be no need to employ matching transformers as is required when matching conventional 600 ohm intertoll trunks to 900 ohm tie trunks.

Let it be assumed that trunk 701 is seized at its remote end by a distant office or remote facility (not shown). The seizure causes the trunk to request an incoming register via an incoming register link (not shown) in the conventional manner. The office code digits of the called number transmitted to the trunk are registered in the incoming register and passed to the marker for decoding. Let it be further assumed that the translation reveals that this call requires the use of private network intertoll type trunk 806. The marker will establish a communications linkage from the line link frame appearance 7*a* of the line link frame portion 701(LL) of trunk 701 to the trunk link frame appearance 8*t* of the trunk link frame portion 806(TL) of intertoll trunk 806. Marker relays 5TOG1,2 (FIG. 5) are operated in the conventional manner. Relay 5TOG1, at its make contact 5TOG1(1) in FIG. 6, prepares an operating ground for the winding of relay 6ENES. The completion of the operating path, however, requires that one only of relays 6TLES and 6LLES be operated unless tandem service class relay 5TSC1 is operated. (Relay 5TSC1 is not operated except for tandem calls incoming over trunk 901 hereinafter to be described.) Relay 6LLES is operated by the ground applied to lead ES1 in the line link portion 701(LL) of trunk 701 (FIG. 7). Contacts TF and TS in trunk 701 are operated as disclosed in the operation of the TF and TS relays in the incoming trunk circuit of the above-mentioned Fisher et al. application. These TF and TS relays are operated by the marker applying an enabling potential to the trunk through the incoming register link. Relay 6LLES operated, at the make contact of its transfer contacts 6LLES(2), makes the winding of relay 6ENES available to the back contact of transfer contacts 6TLES(2). Relay 6TLES, however, is operated by the ground applied to lead ES6 associated with the trunk link frame portion 806(TL) of the called intertoll trunk 806. The trunk link frame portion 806(TL) of the called trunk 806 is identical to the trunk link frame portion 701(TL) of trunk 701 which is shown in detail in FIG. 7. Ground is applied to lead ES6 from the ground provided in the line link frame portion 806(LL) of this trunk over a separate lead in cable C806 and an "F" make contact in the trunk link portion 806(TL) of trunk 806 in the same manner as ground would be applied to lead ES2 in the case of a call, hereinafter to be described, made to trunk 701. By mentally transposing the detailed circuitry shown for trunk 701 to the block diagram rendition of trunk 806, the operation of the circuit is easily explained. The just-mentioned F make contact in lead ES6 is operated incident to the seizure of the trunk link frame portion 806(TL) of the called trunk 806 in the same manner as the "F" relays are operated in the called trunks of the priorly mentioned Busch Patent 2,582,904. The application of ground to lead ES6 operates relay 6TLES (FIG. 6) over the path established through the operated make contacts of the trunk link and trunk link connector circuit 602. The operation of both relays 6LLES and 6TLES interrupts any priorly prepared operating path in series with the winding of relay 6ENES. Lead ESK1, associated with the line link frame portion 701(LL) of calling trunk 701, is steered over the make contact of transfer contact 6LLES(1) and 6TLES(1) to the left-most winding of check relay 6ECK. Lead ESK6, associated with the trunk link frame portion 806(TL) of the called trunk 806, is steered over the make contacts of transfer contacts 6TLES(4) and 6LLES(4) to the center winding of check relay 6ECK. The left-most and center windings of relay 6ECK are wound in opposite manner to the right-most winding of this relay and when all three windings are energized, the relay does not operate. The right-hand winding of relay 6ECK has its circuit completed over make contacts 6TLES(3) and 6LLES(3). Battery is applied to lead ESK1 in the trunk link frame portion 701(TL) of trunk 701 in series with the winding of relay 7OPC and operated make contacts TF and TS. However, due to the resistors in series with the winding of relay 6ECK, relay 7OPC does not operate. A relay similar to relay 7OPC is included in the line link frame portion 806(LL) of trunk 806. This "PC" relay (not shown) applies battery over an individual lead of cable C806 and a make contact similar to make contact F of trunk 701 to lead ESK6. However, the "PC" relay in trunk 806 that is similar to relay 7OPC in trunk 701 does not operate because of the resistance connected in series with the center-most winding of relay 6ECK. Relay 6ECK remaining normal permits marker operations to continue in the normal manner. Thus, in the communications connection established from trunk 701 to trunk 806 there are no attenuation pads. The communications path may be traced from the tip and ring leads incoming from the distant office or remote facility (FIG. 7) over back contacts 7OPC(2) and 7OPC(4), the make contacts of transfer contacts TS1 and the T and R leads of cable C701 to the line link frame appearance *7a* of trunk 701, thence over the line link to the trunk link frame linkage (not shown) to the trunk link frame appearance *8t* of trunk 806. In the trunk link frame portion 806(TL), the relay contacts analogous to relay contacts 7OPC(2) and 7OPC(4) are normal inasmuch as the relay analogous to relay 7OPC remains unoperated. These back contacts analogous to contacts 7OPC(2) and 7OPC(4) extend the communications path for the tip and ring leads from the trunk link frame appearance *8t* of trunk 806 directly to the tip and ring leads outgoing to the distant office or remote facility (not shown) at the distant end of trunk 806.

If it now be assumed that trunk 701 be seized at its remote end on a call to a station of a customer group such as station 802 (FIG. 8), the translation of the called directory number will instruct the marker to operate as for the terminating type of call described, for example, in the above-mentioned copending application of Fisher et al., Serial No. 191,507. In this type of call, linkage will be set from the trunk link frame appearance *7b* of the trunk link frame portion 701(TL) of calling trunk 701 to the line link frame appearance *8h* of the called station 802. The marker operation on a terminating type of call will effectuate the operation of relays 5TER1,2 (FIG. 5) and the operation of the latter relay, at its make contact 5TER2(1) in FIG. 6, will prepare an operating path to the winding of relay 6ENES. Incident to the establishment of the terminating connection to the line link frame appearance of the called line, the class of service of that line will be registered on one of relays 5CST0 through 9 and one of relays 5CSU0 through 9 in FIG. 5. Assuming that station 802 is assigned service class 19, relays 5CST1 and 5CSU9 will operate and at their respective make contacts will complete an operating path to the winding of relay 5WD. Relay 5WD operated, at its make contact 5WD(1) in FIG. 6, advances the operating path prepared by the operation of contact 5TER2(1) toward the winding of relay 6ENES. The ground provided to lead ES2 by the trunk link frame portion 701(TL) of trunk 701 operates relay 6TLES over one of the paths previously traced. Relay 6LLES remains unoperated inasmuch as station 802 is not provided with an ES– lead to the winding of relay 6LLES. The operating path to the winding of relay 6ENES is now complete, being traceable in FIG. 6 over make contacts 5TER2(1), 5WD(1), 6TELS(2), and back contacts 5TSC1(4) and 6LLES(2). Relay 6ENES operated, at its make contact 6ENES(1), shunts down the resistance battery in the left-hand winding of relay 6ESK (contact DCT1 being normal during this phase of a terminating type call). The ground made available at the winding of relay 6ESK is extended over back contact 6LLES(4) and make contact 6TLES(4) to the trunk link and trunk link connector circuit 602 with the trunk link frame portion 701(TL) of calling trunk 701. The ground applied to lead ESK2 operates relay 7OPC which locks to ground over its make contact 7OPC(1). Relay 7OPC operated opens its back contacts 7OPC(2) and 7OPC(4) and closes its make contact 7OPC(3) to insert the attenuation pad in the communications path. The foregoing operation, while described for the case of a call incoming to a station of a customer group such as station 802, applies as well in the case of a call incoming over the same type of trunk to an ordinary telephone subscriber station such as 801, and in this case as well the attenuation pad will be included in the communications connection.

In case trunk 701 is seized by its remote facility on a call to a line link pulsing access circuit 805, the operation proceeds substantially as just described except that the service class accorded the line link pulsing access circuit will not result in the operation of relay 5WD in FIG. 5. Accordingly, no operating path will be completed to the winding of relay 6ENES in FIG. 6 and lead ESK2 of the trunk link frame portion 701(TL) of calling trunk 701 will not be grounded. Relay 7OPC will remain normal and the attenuation pad will remain out of the communications connection.

Should trunk 701 be seized on a call to a facility served by outgoing trunk 803 (FIG. 8), the marker will operate as for a tandem outgoing type of call, as described in the above-mentioned Busch Patent 2,582,904. Briefly, the translation of the called directory number will result in the operation of relays 5TOG1,2 in FIG. 5. The operation of relay 5TOG1, at its make contact 5TOG1(1) in FIG. 6, prepares an operating path to the winding of relay 6ENES. The marker on a tandem outgoing type of call will establish linkage from the line link frame appearance *7a* of the line link frame portion 701(LL) of calling trunk 701 to the trunk link frame appearance *8g* of the outgoing trunk 803. The ground applied to lead ES1 in the line link frame portion 701(LL) of calling trunk 701 operates relay 6LLES over one of the paths previously described. The ground applied to lead ES5 by outgoing trunk 803 operates relay 6TLES over the path established by the operation of relay 6MC2 in the trunk link and trunk link connector circuit 602. Relays 6TLES and 6LLES operated prevent the operating ground made available over contact 5TOG1(1) from operating relay 6ENES. Relay 6ENES remaining normal prevents leads ESK1 and ESK5 from being grounded. Since lead ESK1 is not grounded, relay 7OPC remains normal thereby maintaining trunk 701's attenuation pad out of the communications circuit incoming from the remote facility. Since lead ESK5 is not grounded, relay 8OPC remains normal. Relay 8OPC when normal allows the attenuation pad in trunk 803 to remain in the communications path outgoing to the distant office. Accordingly, the communications connection from trunk 701 to trunk 803 will include only the one attenuation pad that is associated with outgoing trunk 803. In this case, it is to be noted that even though the calling and called trunks both have "ES–" and "ESK–" leads, these trunks are adapted to respond in opposite manners to the energization of these leads by the marker.

Trunk 701 may also be seized on a call originating within the office depicted. For example, line link pulsing circuit 805 may initiated a call to a facility at the distant end of trunk 701. In this case, the marker operates as for a subscriber outgoing call described in detail in the above-mentioned Busch Patent 2,582,904. Line link pulsing access circuit 805, as mentioned above, is not equipped with an ES– or an ESK– lead and, consequently, cannot operate relay 6LLES in FIG. 6. Although relay 5SOG2 is operated by the marker on a subscriber outgoing call, the closure of make contact 5SOG2(1) cannot complete an operating path to the winding of relay 6ENES because relay 5WD (FIG. 5) is not operated and its contact 5WD(1) remains open. Relay 6ENES remaining normal prevents an operating ground being applied to lead ESK2 associated with the trunk link frame portion 701(TL) of the called trunk 701. Relay 7OPC remains normal maintaining trunk 701's attenuation pad out of the communications path to the remote facility.

Trunk 701 may also be called by any of the customer group stations, such as station 802, or by any of the ordinary telephone subscriber stations 801. Operations proceed on these types of calls in similar fashion to that just described except that relay 5WD in FIG. 5 is operated and, at its make contact 5WD(1) in FIG. 6, extends the operating ground made available over make contact 5SOG2(1). Relay 6TLES is operated by the ground applied to lead ES2. Relay 6LLES remains unoperated inasmuch as none of stations 801, 802, etc. are equipped with ES– leads. Relay 6ENES is thus operated causing lead ESK2 to be grounded and causing relay 7OPC to be operated over one of the paths previously traced. Relay 7OPC operated inserts trunk 701's attenuation pad in the connection outgoing to the remote facility.

Line link pulsing access circuit 805 and stations 801 and 802 may, of course, call trunks besides trunk 701. For example, if line link pulsing access circuit 805 initiates a subscriber outgoing type of call to outgoing trunk 803, operations proceed as for a subscriber outgoing call in similar fashion to that described above on the call from line link pulsing access circuit 805 to trunk 701. Relay 6ENES remains normal and lead ESK5 is not grounded, thereby maintaining relay 8OPC normal. Relay 8OPC unoperated maintains the attenuation pad in trunk 803.

On the other hand, when one of stations 801 or 802 calls outgoing trunk 803, relay 5WD is operated, and at its make contact 5WD(1), extends the ground made available over operated make contact 5SOG2(1). Relay 6TLES is operated by the ground applied to lead ES5 by trunk 803. Relay 6TLES operated, at its make contact 6TLES(2), completes the operating ground to the winding of relay 6ENES over back contact 6LLES(2). Relay 6ENES operated, at its make contact 6ENES(1), grounds lead ESK5 and thereby operates relay 8OPC in trunk 803. Relay 8OPC operated, at its make contacts 8OPC(2) and 8OPC(4) and at its back contact 8OPC(3), removes the attenuation pad from the communications connection outgoing to the remote facility.

Referrming now to FIG. 9, incoming toll connecting or interoffice trunk 901 is shown having a trunk link frame portion 901(TL) and a line link frame portion 901(LL) for respectively extending connections to line link frame and trunk link frame circuits. Assuming incoming trunk 901 to have been seized by its remote facility (not shown) on a call to line link pulsing access circuit 805, the marker operates as for a terminating call in the conventional manner thereby effecting the operation of relays 5TER1,2 in FIG. 5 and contacts 9OLF(1) and 9OLF(2) in trunk circuit 901. Contact 9OLF(1) operated grounds lead ES9 and operates relay 6TLES. Relay 6ENES is prevented from operating because relay 5WD is not operated on calls to or from line link pulsing access circuit 805. The winding of relay 6ESK thereby remains connected to resistance battery and lead ESK9 is not grounded. Relay 9OPC thereby remains normal allowing the attenuation pad associated with the trunk link frame portion 901(TL) of trunk 901 to remain in the communications path established from the trunk link frame appearance *9r* of this trunk to the line link frame appearance *8j* of line link pulsing access circuit 805.

When incoming toll connecting or interoffice trunk circuit 901 is seized by its remote facility on a call to one of stations 801 or 802, the marker proceeds as for a terminating type of call, in the manner previously alluded to, except that relay 5WD is operated, and its contacts 5WD(1) complete an operating path to the winding of relay 6ENES. In this operating path, contacts 6TLES(2) are operated because relay 6TLES is operated by the grounding of lead ES9 from the ground originating in the trunk link frame portion 901(TL) of calling trunk 901. Relay 6ENES operated completes an operating ground to lead ESK9, the grounding of which operates relay 9OPC. Relay 9OPC operated, at its make contacts 9OPC(2) and 9OPC(4) and at its back contact 9OPC(3), removes the attenuation pad from the communications circuit incoming from the remote facility.

In the case where trunk 901 is seized by its remote facility on a call to a distant office or remote facility served by private network intertoll type trunk 701, operations proceed as for a tandem outgoing type of call as determined by the translation of the called directory number. Marker tandem service class relay 5TSC1 operates but performs no functions on calls to trunk 701. Linkage will be set by the marker from the line link frame appearance *9p* of incoming trunk 901 to the trunk link frame appearance *7b* of the called trunk 701. Leads ES10 and ESK10 are made available at the line link frame portion 901(LL) of incoming trunk 901 by the operation of make contacts TS(1), TS(2), 90TF(1), and 90TF(2) which are additional contacts of the "TS" and "TF" relays whose windings (not shown) are conventionally provided and operated in tandem incoming trunks seized for use on a tandem outgoing type of call. Relay 6LLES is operated by the ground provided on lead ES10 extended over make contact 6MC1(11) of line link and line link connector circuit 601.

Incident to the establishment of the linkage from the line link frame appearance 9p of the incoming trunk 901 to the trunk link appearance 7b of called trunk 701, contacts 7OF(1) and 7OF(2) of the called trunk are operated closing through leads ES2 and ESK2 between the trunk and trunk link and trunk link connector circuit 602. Trunk 701 grounds lead ES2, operating relay 6TLES. Relays 6LLES and 6TLES operated prevent the operation of relay 6ENES. Relay 6ENES remaining normal prevents ground being applied to leads ESK2 and ESK10 and therefore relays 7OPC and 9OPC remain normal. Relay 7OPC remaining normal maintains trunk 701's attenuation pad out of the communications connection outgoing to the remote facility and relay 9OPC remaining normal maintains trunk 901's attenuation pad in the communications path incoming from the remote facility.

If incoming trunk 901 is seized by its remote facility on a call to a facility served by outgoing trunk 803, operations proceed in similar manner to that described for a tandem outgoing type of call. However, marker tandem service class relay 5TSC1 in FIG. 5 is operated by the incoming register (not shown) that was seized by incoming trunk 901. Relay 5TSC1, at its make contact 5TSC(1), completes an operating ground to the winding of relay 5ST1. Relay 5ST1 operated, at its make contact 5ST(1) in FIG. 3, prepares an operating path to relay 3ENA. The decoding of the called number incoming over trunk 901 results in the grounding of code point CP803 in the conventional manner. The ground on code point CP803 is used to operate peg count relay 3PC1. Relay 3PC1 operated, at its make contact 3PC1(1), extends a ground to operate route relay RT803 which designates the group of trunks appropriate to complete the call. Trunk 803 in FIG. 8 is one of these trunks. It will be noted that the ground on code point CP803 does not otherwise. However, since outgoing toll connecting or interoffice trunk 803 is also equipped with a pad control circuit which normally maintains its pads in the communications connection, the marker on interconnecting trunks 901 and 803 must furnish these trunks pad control instructions or there will be two pads in the established communications connection. Transmission considerations dictate, however, that this type of interconnection should include no attenuation pads in the communications connection and, accordingly, the marker must instruct both these trunks to remove their pads from the circuit. This instruction is initiated by the aforementioned operation of relay 3PC1. However, before completing the description of this phase of operation, it will be well to observe the operating path that is completed to relay 6ENES. Incident to the establishment of the linkage from the line link frame appearance 9p of calling trunk 901 to the trunk link frame appearance 8g of outgoing trunk 803, contacts 8OF(1) and 8OF(2) in outgoing trunk 803 are operated. Operation of contact 8OF(1) grounds lead ES5, operating relay 6TLES. Relay 6LLES is operated by the ground provided to lead ES10 by the line link frame portion 901(LL) of trunk 901. Relays 6LLES and 6TLES operated would normally prevent the completion of an operating path to relay 6ENES. However, the operating ground is completed by make contact 5TSC1(3). Relay 6ENES operated, at its make contact 6ENES(2) in FIG. 3, completes an operating path, made available by the operation of contacts 3PC1(2) and 5ST1(1), to the winding of relay 3ENA. Relay 3ENA operated, at its make contact 3ENA(1), grounds lead ESK10 over the path provided by the make contacts of transfer contacts 6TLES(1) and 6LLES(1). Similarly, make contact 3ENA(2) grounds lead ESK5 over the path including the make contacts of transfer contacts 6LLES(4) and 6TLES(4). The ground provided on lead ESK10 operates relay 9OPC shown in the trunk link frame portion of trunk 901 and the ground on lead ESK5 operates relay 8OPC in outgoing trunk 803. These relays operated remove their respective attenuation pads from the communications path. Thus, on a call incoming over trunk 901 and outgoing over trunk 803, all attenuation pads are switched out of the communications channel.

The foregoing connections are conveniently summarized in the following table:

*Table II*

| Type Call | Description | Calling Ckt. | | Called Ckt. | | Ground | Remarks |
|---|---|---|---|---|---|---|---|
| | | Lead (Class) | Pad | Lead (Class) | Pad | | |
| TOG | P.N. (int.) 701 to P.N. (int.) 806 | ESI | N.O | ES6 | N.O | | Both stay out. |
| TER | P.N. (int.) 701 to CNTX 802 | ES2 | N.O | (5WD) | | (ESK2 | Sw-in calling. |
| TER | P.N. (int.) 701 to L.L.P. 805 | ES2 | N.O | | | | Calling stays out. |
| TOG | P.N. (int.) 701 to OUTG. 803 | ES1 | N.O | ES5 | N.I | | Called stays in. |
| SOG | L.L.P. 805 to P.N. (int.) 701 | | | ES2 | N.O | | Called stays out. |
| SOG | L.L.P. 805 to OUTG. 803 | | | ES5 | N.I | | Called stays in. |
| SOG | O.T.S. 801 to P.N. (int.) 701 | (5WD) | | ES2 | N.O | ESK2 | Sw-in called. |
| SOG | O.T.S. 801 to OUTG. 803 | (5WD) | | ES5 | N.I | ESK5 | Sw-out called. |
| TER | INC. 901 to L.L.P. 805 | ES9 | N.I | | | | Calling stays in. |
| TER | INC. 901 to O.T.S. 801 | ES9 | N.I | (5WD) | | ESK9 | Sw-out calling. |
| TOG | INC. 901 to OUTG. 803 | ES10 | N.I | ES5 | N.I | ESK10 | Sw-out calling and called. |
| TOG | INC. 901 to P.N. (int.) 701 | ES10 | N.I | ES2 | N.O | | Calling stays in, called stays out. |

directly operate the route relay for the corresponding trunk route as was the case of the other code points in FIG. 3. This is because it is necessary to provide additional information to the selected trunk. This provision of this additional information is the function of circuits enabled by the operation of contact 3PC1(2) at the same time that route relay RT803 is operated. This additional information consists of registering the fact that trunk 803 is being called by an incoming toll connecting or interoffice trunk, such as trunk 901, which is provided with a pad control circuit that will normally maintain the pads in a communications connection unless instructed The intraoffice trunk 804 in FIG. 8 includes two pad control relays 9OPCA and 9OPCB which are shown in FIG. 9. On an intraoffice call between stations, such as stations 801 and 802, lead ES7 is grounded by trunk 804 incident to the seizure of this trunk by the marker and the marker's operation of the "F" relay, one of whose contacts 9OF(1) is in series with lead ES7. The ground on lead ES7 is extended over operated make contacts LCO(1) and 6MC2(11) of the trunk link and trunk link connector circuit 602 (FIG. 6) to the winding of relay 6TLES, operating this relay. On an intraoffice call, relay 5NSI is operated and its make contact 5NSI(3)

prepares an operating path to the winding of relay 6ENES. The first communications linkage established on an intraoffice call is from the intraoffice trunk to the called line, and the second linkage established is from the intraoffice trunk to the calling line. Incident to the establishment of the first linkage, the line link frame of the called line is seized and its class of service registered on the 5CST– and 5CSU– relays in FIG. 5. Assuming that the called station is a customer group station such as station 802, relay 5WD will be operated upon the seizure of the called line's line link frame. Relays 5WD and 5NSI operated, at their respective make contacts 5NSI(3) and 5WD(1), complete an operating path to the winding of relay 6ENES over make contacts 6TLES(2) and back contacts 6LLES(2). Relay 6ENES operates and, at its make contact 6ENES(1), applies the ground made available over back contact DCT1 to the winding of relay 6ESK. On an intraoffice call, back contact DCT1 (shown in FIG. 6 in the operating path for relay 6ESK) remains normal during the establishment of the linkage from the intraoffice trunk to the called line. The ground applied to the winding of relay 6ESK is continued over back contacts 6LLES(4) and make contacts 6TLES(4) through the operated make contacts 6MC2(12) and LCO(2) of the trunk link and trunk link connector circuit 602 to lead ESK7 operating relay 9OPCA in trunk 804. Relay 9OPCA, at the make contacts of its transfer contacts (shown in FIG. 8), conditionally inserts trunk 804's attenuation pad in the communications path outgoing from the trunk link frame appearance 8*m* of trunk 804 to the called station.

After the linkage from the intraoffice trunk to the called station is established, contact DCT1 operates removing the ground from lead ESK7. Relay 9OPCA does not, however, release having locked to ground over its make contact 9OPCA(1) which ground is maintained by the trunk unless the call is abandoned. The completion of the establishment of the linkage to the called station allows contacts LCO(1) and LCO(2), which are in series with leads ESK7 and ES7, to release. Relay 6TLES is thereupon released. The completion of the linkage to the called station also releases relay FTK1, one of whose contacts is shown in FIG. 4 in the ground supply circuit for the line class of service cross-connections of the line link and line link connector circuit 601. This releases the line location and class of service information pertaining to the called line. The marker next proceeds, in the manner described in the priorly mentioned Busch Patent 2,582,904, to establish the connection from the intraoffice trunk to the calling line. Incident to the establishment of this connection, relay SCB1 is operated and its illustrated make contact SCB1 in FIG. 6 prepares a second ground path to the winding of relay 6ESK. In this ground path, contact DCT2 remains normal until the release of the marker from the established connection. Upon the seizure of the calling station, its class of service is registered on relays 5CST– and 5CSU– in FIG. 5. Assuming station 801 to be the calling station, relay 5WD will be operated preparing a path to the winding of relay 6ENES. Incident to the establishment of the communications path from the intraoffice trunk to the calling line, the ground provides to lead ES8 over make contact 9OF(4) in trunk 804 is extended over operated make contacts LC1(1) and 6MC2(13) to the winding of relay 6TLES reoperating this relay. Relay 6LLES, however, remains normal. The path prepared by the operation of contacts 5NSI(3) and 5WD(1) is completed over make contact 6TLES(2) and back contact 6LLES(2) to the winding of relay 6ENES reoperating this relay. Ground is then applied over back contacts DCT2 and make contacts SCB1 and 6ENES(1), the winding of relay 6ESK, back contact 6LLES(4) and make contacts 6TLES(4), 6MC2(14), and LC1(2) to lead ESK8 operating relay 9OPCB in trunk 804. Relay 9OPCB operated, at the make contacts of its transfer contacts shown in FIG. 8, removes the attenuation pad that was conditionally inserted by the operation of relay 9OPCA.

Intraoffice calls may also be completed between stations such as 801 or 802 and a line link pulsing access circuit such as 805, and also between line link pulsing access circuit 805 and another such line link pulsing access circuit (not shown). On an intraoffice call between a station and a line link pulsing access circuit, relay 5WD will be operated incident to the establishment of the connection to the line link frame appearance of the calling or called station but will not be operated incident to the seizure of the line link frame appearance of the calling or called line link pulsing access circuit. Relays 9OPCA and 9OPCB will respectively be operated whenever the associated trunk link appearances 8*m* and 8*k* of trunk 804 are connected to a station such as 801 or 802 and these relays will respectively remain nonoperated when their associated trunk link frame appearances are connected to the line link pulsing access circuit. Accordingly, on connections between a station and a line link pulsing access circuit, the intraoffice trunk 804 will insert its pad and on connections between line link pulsing access circuits, the intraoffice trunk will maintain its attenuation pad out of the communications path.

Attendant trunk 702 in FIG. 7 is provided with two line link frame appearances 7*c* and 7*d*, respectively, which are selected by the operation of relay 71PC. With relay 71PC normal, the back contacts of its transfer contacts 71PC(2) and 71PC(3) connect the attendant console (not shown) to line link frame appearance 7*d* for the extension of a call. Attendant trunk 702 receives calls at its trunk link frame appearance 7*e* in the same manner that attendant trunk 103 received calls at its trunk link frame appearance 1*p* (FIG. 1). For example, if a call is directed to attendant trunk 702 in response to the seizure of incoming trunk 901, the call will be routed from line link frame appearance 9*p* of trunk 901 to the trunk link frame appearance 7*e* of attendant trunk 702. Line link frame appearance 9*p* of incoming trunk 901 causes relay 5WD in FIG. 5 to operate incident to the establishment of the linkage from appearance 9*p* to appearance 7*e*. The line link frame portion 901(LL) of incoming trunk 901 is not provided with an "ES–" lead and, therefore, relay 6LLES remains normal. The ground provided to lead ES4 by trunk 702, however, operates relay 6TLES. Contact 5NSI(3) is operated incident to the establishment of the aforementioned linkage 9*p*–7*e* and an operating path to the winding of relay 6ENES is completed which may be traced from ground, over make contacts 5NSI(3), 5WD(1), 6TLES(2), and back contact 6LLES(2) to the winding of relay 6ENES. Relay 6ENES operated, at its make contact 6ENES(1), grounds lead ESK4 operating relay 71PC in trunk 702. Relay 9OPC is not operated inasmuch as leads ES9 and ESK9 are not cut through to the marker because the trunk link and trunk link connector circuit contacts 6MC2(9) and 6MC2(10) are not operated. The operation of relay 71PC, at its make contacts 71PC(1) and 71PC(3), connects the attendant console to line link frame appearance 7*c*. Line link frame appearance 7*c*, when selected by the attendant for the extension of an outward call, causes relay 5WD in FIG. 5 to operate. The operation of relay 5WD prepares an operating path to the winding of relay 6ENES in the same manner that such an operating path is provided on a call outgoing from one of stations 801 or 802. Accordingly, the pad control signals generated by the marker responsive to the outward extension of calls from appearances 7*c* and 7*d*, respectively, reflect the transmission classification accorded the circuit which initially seized the trunk link appearance 7*e* of attendant trunk 702. In this manner, there is no need to provide attenuation pads in the attendant trunk itself.

It is to be understood that numerous modifications and alterations may be made by those skilled in the art without departing from the spirit and scope of the invention defined herein.

What is claimed is:

1. In a telephone office for interconnecting individual lines, customer group lines and private and common carrier trunks, an interconnection-controlling marker comprising means for registering an indication of the presence of a switchable attenuation pad in any of said trunks, means for registering an indication of the transmission quality classification assigned to each of said lines and trunks at their respective appearances in said office, means for transmitting attenuation pad switching signals to said trunks, and means operable incident to the interconnection of any of said lines and trunks and responsive to the operation of both said registering means for controlling said transmitting means to transmit signals for switching said pads in accordance with the registered transmission quality classifications assigned said lines and trunks under interconnection.

2. A telephone office in accordance with claim 1 wherein said means for transmitting is controlled to transmit signals for switching said pads into interconnections between lines and trunks having different transmission quality classifications and to transmit signals for switching said pads out of the interconnections between lines and trunks having the same transmission quality classifications.

3. A crossbar telephone switching office having both private network lines and trunks and message network trunks appearing therein, at least certain of said trunks having transmission line balance compensating pad switching circuits therein, predetermined ones of said certain trunks having appearances on the line link and on the trunk link frames of said crossbar office, means for determining the class of any call according to the direction in which said call is switched between said frames, said office being characterized by common switch-controlling marker means normally functioning to control said pad switching circuits in said trunks in accordance with the class of call registered by said determining means, means at said marker for receiving distinctive marks from said line and trunk link frames upon said marker being connected thereto, and logic circuit means in said marker controlled by said marks receiving means for modifying said normal pad controlling functions incident to the establishment of a connection between said marker and each of said line link and trunk link frames.

4. In a central office system, in combination, a first plurality of trunks each having switchable low return loss compensating attenuation pads, a second plurality of trunks having said switchable attenuation pads, a plurality of station lines randomly exhibiting less than a predetermined return loss, a connection-controlling marker, switching means controlled by said marker for establishing communications connections among any of said first and second plurality of trunks and said station lines, first operable means for indicating to said marker the presence of said switchable pads in said trunks in any of said connections being established, second operable means for indicating to said marker the return loss characteristics of said lines in any of said connections being established, and means responsive to both said operable means for transmitting pad control signals to any of said first plurality and to any of said second plurality of trunks in said connections being established.

5. In a central office system according to claim 4, the combination wherein said signals transmitted by said responsive means controls said trunks to switch all of said attenuation pads out of said communications connections established between any of said first plurality of trunks, and to maintain no more than one of said attenuation pads in any communications connection established between any trunk of said first plurality of trunks and any trunk of said second plurality of trunks.

6. In a central office system according to claim 4, the combination wherein one of said first plurality of trunks is connectable between two of said second plurality of trunks, and wherein said one of said first plurality of trunks includes means responsive to said signals for registering an indication of the presence of said switchable pads in any of said trunks between which it is connected.

7. In a central office system having a plurality of line and trunk circuits classified according to transmission quality, the combination of a connection-controlling marker for transmitting pad switching signals to predetermined ones of said trunk circuits undergoing connection on a call with a trunk circuit having an input and at least two output appearances exhibiting different transmission quality classifications in said central office and adapted to receive said pad switching signals to select one of said output appearances.

8. In a central office system according to claim 7, the combination wherein said marker includes means for transmitting to said trunk circuits a first pad switching signal incident to the connection of one of said line and trunk circuits to said input appearance of said trunk, and wherein said marker further includes means operable incident to the connection to one of said output appearances of said trunk circuit for transmitting a second pad switching signal to said trunk circuits.

9. A crossbar telephone switching office having both private network lines and trunks and message network trunks appearing therein, at least certain of said trunks having return loss compensating pad switching circuits therein, predetermined ones of said certain trunks having appearances on the line link and on the trunk link frames of said crossbar offices, common switch-controlling marker means for registering the class of call being switched between said frames, said office being characterized by said marker means normally functioning to control said pad switching circuits in said trunks in accordance with said class of call registered in said registering means, said class of call being determined by the direction in which said calls are switched between said frames, means at said marker for receiving distinctive mark signals from said lines and trunks, and logic circuit means in said marker responsive to the receipt of said distinctive signals for modifying said pad controlling functions dictated by said registering means incident to the establishment of a connection between said line link and trunk link frames.

10. A crossbar telephone switching office according to claim 9 further characterized in that at least one of said predetermined ones of said certain trunks has a first line link appearance for furnishing to said marker when connected thereto an indication signifying the presence in said one trunk of a compensating pad switching circuit and a second line link frame appearance for furnishing an indication signifying the absence from said trunk of any said pad switching circuit.

No references cited.

KATHLEEN H. CLAFFY, *Primary Examiner.*

WILLIAM C. COOPER, *Examiner.*